(12) United States Patent
Frank et al.

(10) Patent No.: US 8,616,320 B2
(45) Date of Patent: Dec. 31, 2013

(54) AUTOMATED VEHICLE AND SYSTEM UTILIZING AN OPTICAL SENSING SYSTEM

(75) Inventors: Jonathan D. Frank, Los Gatos, CA (US); Ian D. Kovacevich, Charlotte, NC (US); Lawrence Ober, Pineville, NC (US)

(73) Assignee: Edison Nation, LLC, Charlotte, NC (US)

( * ) Notice: Subject to any disclaimer, the term of this patent is extended or adjusted under 35 U.S.C. 154(b) by 0 days.

(21) Appl. No.: 13/236,336

(22) Filed: Sep. 19, 2011

(65) Prior Publication Data

US 2012/0125707 A1    May 24, 2012

Related U.S. Application Data

(63) Continuation of application No. 13/099,632, filed on May 3, 2011, now abandoned, which is a continuation-in-part of application No. 12/705,157, filed on Feb. 12, 2010, now Pat. No. 8,245,807.

(60) Provisional application No. 61/152,063, filed on Feb. 12, 2009, provisional application No. 61/178,537, filed on May 15, 2009, provisional application No. 61/296,455, filed on Jan. 19, 2010.

(51) Int. Cl.
*B62D 1/24*    (2006.01)

(52) U.S. Cl.
USPC ........................................................ 180/169

(58) Field of Classification Search
USPC ................................................ 180/167, 169
See application file for complete search history.

(56) References Cited

U.S. PATENT DOCUMENTS

| | | |
|---|---|---|
| 3,130,803 A | 4/1964 | Wiggins |
| 3,669,209 A | 6/1972 | Brooke |
| 3,849,931 A | 11/1974 | Gulley, Jr. |
| 4,086,724 A | 5/1978 | McCaslin |

(Continued)

FOREIGN PATENT DOCUMENTS

| | | |
|---|---|---|
| DE | 3444426 A1 | 6/1986 |
| JP | 2001113055 A | 4/2001 |
| JP | 2009044246 A | 2/2009 |

OTHER PUBLICATIONS

Information Disclosure Statement (IDS) Letter Regarding Common Patent Application(s), dated Dec. 20, 2011.

(Continued)

*Primary Examiner* — Jeffrey J Restifo
*Assistant Examiner* — Erez Gurari
(74) *Attorney, Agent, or Firm* — Tillman Wright, PLLC; James D. Wright; David R. Higgins

(57) ABSTRACT

An automated vehicle includes a vehicle body, a power source, one or more motors housed within the vehicle body and in operable connection with the power source, running gear in operable connection with the one or more motors for facilitating movement and supporting the vehicle body upon a surface, and an optical system. The optical system includes an optical sensor for detecting light reflected from the surface and generating an output in response to the light reflected, and one or more light sources, each light source capable of projecting light on the surface. Furthermore, the optical system is configured to regulate an amount of power supplied to the one or more motors in response to the output generated by the optical sensor.

20 Claims, 28 Drawing Sheets

(56) References Cited

U.S. PATENT DOCUMENTS

| | | | |
|---|---|---|---|
| 4,466,801 A | 8/1984 | Dittakavi et al. | |
| 4,505,682 A | 3/1985 | Thompson | |
| 4,566,032 A | 1/1986 | Hirooka et al. | |
| 4,593,239 A * | 6/1986 | Yamamoto | 318/587 |
| 4,658,928 A | 4/1987 | Seo | |
| 4,925,424 A | 5/1990 | Takahashi | |
| 4,962,453 A * | 10/1990 | Pong et al. | 701/23 |
| 4,990,117 A | 2/1991 | Yonezawa | |
| 5,297,484 A | 3/1994 | Piserchia et al. | |
| 5,415,553 A | 5/1995 | Szmidla | |
| 5,622,236 A | 4/1997 | Azumi et al. | |
| 5,630,743 A | 5/1997 | Shi | |
| 5,716,275 A | 2/1998 | Wada et al. | |
| 5,816,886 A | 10/1998 | Cusolito | |
| 5,908,345 A | 6/1999 | Choi | |
| 5,995,883 A * | 11/1999 | Nishikado | 701/23 |
| 6,059,657 A * | 5/2000 | Oh et al. | 463/6 |
| 6,168,494 B1 | 1/2001 | Engel et al. | |
| 6,482,064 B1 | 11/2002 | Lund | |
| 6,629,028 B2 * | 9/2003 | Paromtchik et al. | 701/23 |
| 6,695,668 B2 * | 2/2004 | Donahue et al. | 446/175 |
| 7,408,654 B1 * | 8/2008 | Hardin et al. | 356/617 |
| 7,903,842 B2 * | 3/2011 | Satonaka | 382/104 |
| 7,905,761 B2 * | 3/2011 | Weiss et al. | 446/454 |
| 8,245,807 B2 * | 8/2012 | Frank et al. | 180/169 |
| 2002/0102910 A1 | 8/2002 | Donahue et al. | |
| 2006/0206243 A1 * | 9/2006 | Pawlicki et al. | 701/1 |
| 2006/0238374 A1 * | 10/2006 | Saeki | 340/825.72 |
| 2010/0230198 A1 * | 9/2010 | Frank et al. | 180/169 |
| 2011/0024203 A1 * | 2/2011 | Fleischhacker et al. | 180/53.5 |

OTHER PUBLICATIONS

Information Disclosure Statement (IDS) Letter Regarding Common Patent Application(s), dated Jul. 10, 2012.

* cited by examiner

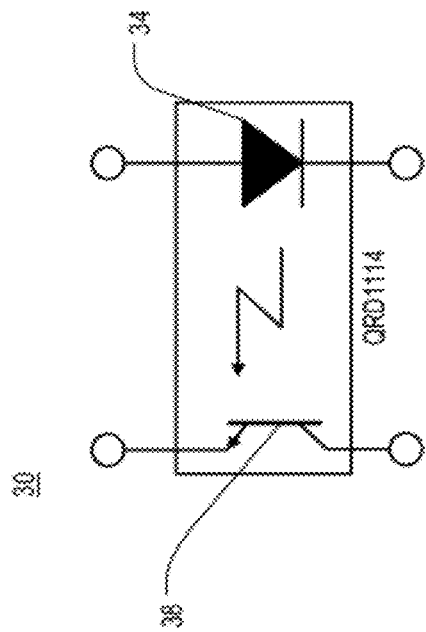
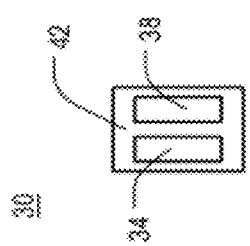
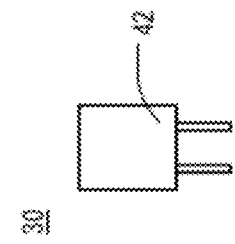
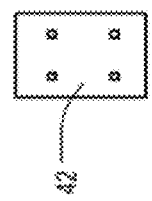
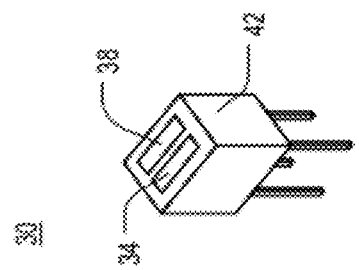

AUTOMATED VEHICLE AND SYSTEM UTILIZING AN OPTICAL SENSING SYSTEM

CROSS-REFERENCE TO RELATED APPLICATIONS

The present application is a U.S. continuation of, and claims priority under 35 U.S.C. §120 to, U.S. patent application Ser. No. 13/099,632, filed May 3, 2011 now abandoned ("the '632 application"), which '632 application is a U.S. continuation-in-part of, and claims priority under 35 U.S.C. §120 to, U.S. patent application Ser. No. 12/705,157, filed Feb. 12, 2010 now U.S. Pat. No. 8,245,807 (the "'157 Application"), which '157 Application published as U.S. Patent Application Publication No. US 2010/0230198 A1 on Sep. 16, 2010, and which '157 Application is a U.S. nonprovisional patent application of, and claims priority under 35 U.S.C. §119(e) to, each of the following: U.S. provisional patent application Ser. No. 61/152,063, filed Feb. 12, 2009; U.S. provisional patent application Ser. No. 61/178,537, filed May 15, 2009; and U.S. provisional patent application Ser. No. 61/296,455, filed Jan. 19, 2010. The entire disclosure of each of the foregoing patent applications and patent application publications is hereby incorporated herein by reference.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to vehicle guidance systems by means of optical gradients and automated vehicles or toys that can track and follow an optical gradient line. The present invention further relates to vehicle guidance systems that can detect, analyze and respond to lines of various colors.

Numerous automated vehicles, utilizing a variety of guidance means, are known. U.S. Pat. No. 5,622,236 discloses a guidance system for a self-propelled vehicle which tracks a luminescent guidance line drawn along a predetermined traveling path on a floor surface. U.S. Pat. No. 4,947,094 discloses drawing a guidance system on a ceiling. U.S. Pat. No. 3,669,209 discloses a vehicle guidance system in which a vehicle having a magnetic sensing device is guided in a desired path in relation to lines of constant magnetic field strength which are set up by a system of guide members. U.S. Pat. No. 5,815,825 discloses a guidance system using magnetic markers in the floor surface itself. U.S. Pat. No. 6,629,028 discloses an optical guidance system utilizing a computer-controlled mounted laser to direct mobile bodies.

A need exists for improvement in optical guidance systems for vehicles that are simple, and thus economical to incorporate into a children's toy, allow for smooth steering and variation in speed, and provide a means to allow users to create, construct, and alter their own guidance tracks. These, and other needs, are addressed by one or more aspects of the present invention.

SUMMARY OF THE INVENTION

The present invention includes many aspects and features. Moreover, while many aspects and features relate to, and are described in, the context of automated toy vehicles and associated guidance systems, the present invention is not limited to use only in connection with toy vehicles for children, as will become apparent from the following summaries and detailed descriptions of aspects, features, and one or more embodiments of the present invention.

Accordingly, one aspect of the present invention relates to an automated vehicle that uses one or more optical sensing devices to follow a path having an optical gradient. In features of this aspect, the vehicle is a children's toy. In another feature, the vehicle resembles an automobile. In yet another feature, the vehicle comprises four wheels, two or more motors, and a battery in circuit connection with the optical sensing devices. In another feature, each rear wheel is driven by a separate motor. In yet another feature the optical sensing devices are reflective object sensors, such as QRD1113/1114 Reflective Object Sensors.

Another aspect of this invention relates to a surface with a path having an optical gradient. In features of this aspect, the shade of the optical gradient, when detected by an optical sensing device affixed to an automated vehicle, has an effect upon the speed of the vehicle. In another feature, detection by the optical sensing device of a path, or portion of a path, that is black in color causes the vehicle to move at a maximum speed, and detection by the optical sensing device of a path of a lighter shade causes the vehicle to move at a reduced speed. In another feature, detection by the optical sensing device of a path, or portion of a path, that is white causes the vehicle to move at a maximum speed, and detection by the optical sensing device of a path of a darker color causes the vehicle to move at a reduced speed. In yet another feature, the optical gradient includes a dark line segment printed on a light background; the dark line segment having a solid dark center band portion, and two variable shade side band portions that are adjacent to the solid center band portion; wherein each variable shade side band portion has both an outer edge and an inner edge; the inner edge being of the same shade as the solid center band portion and the outer edge being of the same shade as the light background; wherein each variable shade side band portion gradually and continuously changes in shading between the inner edge and outer edge.

In yet a further feature, the optical gradient is comprised of a plurality of shaded bands, including a centermost band and a plurality of adjacent bands; the centermost band being of the darkest shade and each adjacent band, moving outward from the centermost band, being of a lighter shade; wherein each band is separate and discrete from each adjacent band. Other aspects of the invention include the gradient path being a curved path, being printed on sheets of paper, being printed on puzzle pieces having notched interlocking edges, allowing for pieces to be affixed to one another, and being printed on sheets having notched interlocking edges, allowing the sheets to be affixed to one another.

Another aspect of the invention relates to a guided vehicle system including a surface with a path having an optical gradient printed thereon; and an automated vehicle having one or more optical sensing devices; wherein the optical sensing devices detect the shade of the optical gradient printed on the surface and cause the automated vehicle to follow the path of the optical gradient.

In a feature of this aspect, the vehicle is a children's toy. In another feature of this aspect, the vehicle resembles an automobile. In a further feature, the vehicle further comprises four wheels, two or more motors, and a battery; wherein the battery, the motors, and the optical sensing devices are in circuit connection. In yet another feature, each rear wheel is driven by a separate motor. In another feature the optical sensing devices are reflective object sensors. In another feature, the reflective object sensors are QRD1113/1114 Reflective Object Sensors.

In another feature of this aspect, the shade of the optical gradient, when detected by an optical sensing device affixed to an automated vehicle, has an effect upon the speed of the vehicle. In yet another feature, detection by the optical sensing device of a path, or portion of a path, that is black in color causes the vehicle to move at a maximum speed, and detection by the optical sensing device of a path of a lighter shade causes the vehicle to move at a reduced speed. In still yet another feature, the optical gradient includes a dark line segment printed on a light background; the dark line segment having a solid dark center band portion, and two variable shade side band portions that are adjacent to the solid center band portion; wherein each variable shade side band portion has both an outer edge and an inner edge; the inner edge being of the same shade as the solid center band portion and the outer edge being of the same shade as the light background; wherein each variable shade side band portion gradually and continuously changes in shading between the inner edge and outer edge. In yet another feature, the optical gradient is comprised of a plurality of shaded bands, including a centermost band and a plurality of adjacent bands; the centermost band being of the darkest shade and each adjacent band, moving outward from the centermost band, being of a lighter shade; wherein each band is separate and discrete from each adjacent band. In further features, the path is curved, the path is printed on sheets of paper, and the path is printed on puzzle pieces having notched interlocking edges, allowing for pieces to be affixed to one another.

Another aspect of the present invention relates to a method of using a guided vehicle system. In features of this aspect, the method includes: assembling a path having an optical gradient upon a surface; and placing an automated vehicle with one or more optical gradient sensing devices upon the surface so as to detect the optical gradient; wherein the detection of the optical gradient by the vehicle causes the vehicle to move along the path. In another feature of this aspect, the method includes the further step of printing a path having an optical gradient. In yet another feature, the method includes the step of downloading a path having an optical gradient from a website prior to printing the path. In a further feature, the method includes the step of using software to design a custom path having an optical gradient prior to printing the path. In yet a further feature, the method includes the step of affixing the printed path having an optical gradient to a surface, wherein the surface is comprised of interlocking puzzle pieces. In a final feature, the method includes the step of affixing road signs to the surface.

Another aspect of the present invention relates to an automated vehicle. An exemplary such automated vehicle includes a vehicle body, a power source, one or more motors housed within the vehicle body and in operable connection with the power source, running gear in operable connection with the one or more motors for facilitating movement, and an optical system including one or more optical sensors positioned generally at an underside of the vehicle body, the one or more optical sensors being configured to generate an output in response to a path. Furthermore, in this aspect of the invention, the optical system is configured to regulate an amount of power supplied to the one or more motors in response to the output generated by the one or more optical sensors.

In a feature of this aspect of the invention, the running gear includes two or more wheels. In another feature, the vehicle body resembles a car. In yet another feature, the running gear comprises two or more continuous tread assemblies. In still another feature, the vehicle body resembles a tank. In another feature, the output generated by the one or more optical sensors is a function of a brightness level of the path. In a further feature, the brightness level of the path is determined by one or more light emitters projecting light onto the path and the one or more optical sensors detecting a portion of the projected light reflected from the path. In a further feature still, the amount of power supplied to the one or more motors is proportional to the brightness level of the path. Alternatively, the amount of power supplied to the one or more motors is inversely proportional to the brightness level of the path. In another feature, the path is grayscale. Alternatively, the path is one or more colors. In still another feature, the one or more optical sensors are capable of measuring RGB color values of the path, and wherein the amount of power supplied to the one or more motors is determined by the sum of the RGB color values. In a further feature, the sum of the RGB values increases, the amount of power supplied to the one or more motors increases, and wherein, as the sum of the RGB values decreases, the amount of power supplied to the one or more motors decreases. In an additional feature, the automated vehicle further comprises a speaker configured to produce one or more sounds in response to the color of the path. In another feature of this aspect, the automated vehicle further comprises a display LED configured to be activated in response to the color of the path.

Another aspect of the present invention relates to an automated vehicle system. An exemplary such system includes a path and an automated vehicle. The automated vehicle includes a vehicle body, a power source, one or more motors housed within the vehicle body and in operable connection with the power source, at least one running gear in operable connection with the one or more motors, and an optical system in operable connection with the power source and configured to detect the path by transmitting light onto the path and measuring light reflected from the path, the optical system being configured to generate an output in response to the path. Furthermore, the automated vehicle is configured to follow the path in response to the output generated by the optical system.

In a feature of this aspect of the invention, the path has a shade corresponding to the intensity of the light reflected by the path, and wherein the shade of the path, when detected by the optical system, affects the speed of the automated vehicle. In another feature, the path is drawn on a surface. In an additional feature, the path is drawn using a crayon. Alternatively, the path is drawn using a marker. Alternatively, the path is drawn using a colored pencil. Alternatively, the path is drawn using chalk. In another feature, the path is grayscale. Alternatively, the path is one or more colors. In another feature of this aspect, the path is comprised of line segments printed on sheets of paper. In yet another feature, the sheets of paper are arrangeable to create a custom track. In still another feature, the path is comprised of two or more puzzle pieces that are attachable together, each with pre-printed line segments.

Another aspect of the present invention relates to an automated vehicle. An exemplary such automated vehicle includes a vehicle body, a power source, first and second motors each housed within the vehicle body and in operable connection with the power source, a first running gear in operable connection with the first motor and a second running gear in operable connection with the second motor, the first and second running gears facilitating movement and supporting the vehicle body upon a surface, and an optical system. The optical system includes a right sensor, including a right emitter and a right receiver, in operable connection with the first motor and positioned to project light onto the surface and detect light reflected therefrom, wherein the right sensor is configured to generate a right sensor output in response to a path on the surface, and a left sensor, including a left emitter and a left receiver, in operable connection with the second motor and positioned to project light onto the surface and detect light reflected therefrom, wherein the left sensor is configured to generate a left sensor output in response to the path on the surface. Furthermore, the optical system is configured to regulate an amount of power supplied to the first motor in response to the right sensor output and an amount of power supplied to the second motor in response to the left sensor output, respectively.

In a feature of this aspect of the invention, each of the first and second running gears comprises one or more wheels. In another feature, the vehicle body resembles a car. Alternatively, each of the first and second running gears comprises a continuous tread assembly. In another feature the vehicle body resembles a tank. In still another feature, the output generated by the right sensor is a function of a brightness level of a portion of the path positioned beneath the right sensor and the left sensor output is a function of a brightness level of a portion of the path positioned beneath the left sensor. In yet another feature, the amount of power supplied to each of the first and second motors is proportional to the brightness level of a portion of the path. Alternatively, the amount of power supplied to each of the first and second motors is inversely proportional to the brightness level of a portion of the path. In a further feature, the path is grayscale. Alternatively, the path is one or more colors.

Another aspect of the present invention relates to an automated vehicle. An exemplary such automated vehicle includes a vehicle body having a right side and a left side, the right side separated from the left side by a centerline, a power source comprising one or more batteries housed within the vehicle body, first and second motors housed within the vehicle body and in operable connection with the power source, a first running gear in operable connection with the first motor and a second running gear in operable connection with the second motor, the first and second running gears facilitating movement and supporting the vehicle body upon a surface, a microcontroller in operable connection with the power source, the first motor and the second motor, the microcontroller being capable of performing logic operations, and an optical system in operable connection with the microcontroller. The optical system includes a light source positioned generally at an underside of the vehicle body and configured to project light on the surface, a right optical sensor positioned to detect light reflected from the surface to the right of the centerline and generate a right sensor output in response to a path on the surface, and a left optical sensor positioned to detect light reflected from the surface to the left of the centerline and generate a left sensor output in response to the path on the surface. Furthermore, the microcontroller is configured to regulate an amount of power supplied to the first motor in response to the right sensor output and an amount of power supplied to the second motor in response to the left sensor output, respectively.

In a feature of this aspect of the invention each of the first and second running gears comprises one or more wheels. In another feature the vehicle body resembles a car. In a feature of this aspect each of the first and second running gears comprises a continuous tread assembly. In another feature, the vehicle body resembles a tank. In a further feature, the left sensor output and the right sensor output are each functions of the brightness level of the path. In another feature, the amount of power supplied to the first motor and the second motor is proportional to the brightness level of the path. Alternatively, the amount of power supplied to the first motor and the second motor is inversely proportional to the brightness level of the path. In another feature, the path is grayscale. Alternatively, the path is one or more colors. In yet another feature, the right sensor output is comprised of RGB-component values of a portion of the path detected by the right optical sensor, and the left sensor output is comprised of RGB-component values of a portion of the path detected by the left optical sensor. In still a further feature, the microcontroller is capable of performing logic operations based on the right sensor output and the left sensor output. In an additional feature, the amount of power supplied to the first motor is proportional to the sum of the values comprising the right sensor output, and wherein the amount of power supplied to the second motor is proportional to the sum of the values comprising the left sensor output. In still another feature, the vehicle further comprises a speaker configured to generate one or more sounds in response to the color of the path. In another feature of this aspect of the invention, the automated vehicle further comprises a display LED configured to be activated in response to the color of the path.

Another aspect of the present invention relates to an automated vehicle system. An exemplary such system includes a surface with a path having an optical gradient and an automated vehicle. The automated vehicle includes a vehicle body, a power source, one or more motors housed within the vehicle body and in operable connection with the power source, two running gears in operable connection with the one or more motors, and an optical system in operable connection with the power source and configured to detect the path by transmitting light onto the path and measuring light reflected from the path, the optical system being configured to generate an output in response to the path. Furthermore, the automated vehicle is configured to follow the path in response to the output generated by the optical system.

In a feature of this aspect of the invention, the path has a shade corresponding to the intensity of the light reflected by the path, and wherein the shade of the path, when detected by the optical system, affects the speed of the automated vehicle. In another feature, detection by the optical system of a portion of the path that has a darker shade causes the vehicle to move at a fast speed, and detection by the optical system of a portion of the path that has a lighter shade causes the vehicle to move at a slow speed. In still another feature, the optical gradient includes a dark line segment printed on a light background, the dark line segment having a solid dark center band portion and two variable shade side band portions at either side of the center band portion, each variable shade side band portion has both an outer edge and an inner edge, the inner edge being of the same shade as the solid center band portion and the outer edge being of the same shade as a light background, and each variable shade side band portion gradually and continuously changes in shading from the inner edge to the outer edge. In yet another feature, the optical gradient is comprised of a plurality of shaded bands, including a centermost band and a plurality of adjacent bands, the centermost band being of the darkest shade and each adjacent band, moving outward from the centermost band, being of a lighter shade, and each of the shaded bands is separate and discrete from the other shaded bands. In a further feature, the path is curved. In yet a further feature, the path is printed on sheets of paper. In still a further feature, the path is printed on puzzle pieces having notched interlocking edges, thereby permitting the puzzle pieces to be attached to one another.

Yet another aspect of the present invention relates to an automated vehicle system. An exemplary such aspect includes a surface with a path comprising one or more colors and an automated vehicle. Such an automated vehicle includes a vehicle body, a power source, one or more motors housed within the vehicle body and in operable connection with the power source, two running gears in operable connection with the one or more motors, a microcontroller, and an optical system in operable connection with the power source and configured to detect the path by transmitting light onto the path and measuring the light reflected from the path, the optical system being configured to generate an output in response to the path. Furthermore, the output from the optical system is received and processed by the microcontroller. Further still, the automated vehicle is configured to follow the path in response to an output received from the microcontroller based on the processed output from the optical system.

In a feature of this aspect of the invention, the optical system comprises a light source and one or more optical sensors. In another feature of this aspect, the light source emits alternately red light, green light, and blue light onto the path, and wherein the one or more optical sensors measure the red light, green light, and blue light reflected from the path. In still another feature, the microcontroller sums the red light, green light, and blue light values measured by each of the one or more optical sensors and stores the values as an RGB array. In another feature still, the speed of the automated vehicle is determined by the sum of the values of the RGB array as computed by the microcontroller. In still another feature, the speed of the automated vehicle is proportional to the sum of the values of the RGB array. In yet another feature, the path is drawn on a surface. In another feature, the path is drawn using a crayon. Alternatively, the path is drawn using a marker. Alternatively, the path is drawn using a colored pencil. Alternatively, the path is drawn using chalk. In another feature of this aspect of the invention, the path is curved. In still another feature, the path is printed on sheets of paper. In yet another feature, the path is printed on puzzle pieces having notched interlocking edges, thereby permitting the puzzle pieces to be attached to one another.

Another aspect of the present invention relates to a method of using an automated vehicle system. An exemplary such method includes the steps of providing an automated vehicle having a vehicle body, a power source, one or more motors housed within the vehicle body and in operable connection with the power source, at least one running gear in operable connection with the one or more motors, and an optical system in operable connection with the power source, assembling a path to be followed by the automated vehicle, and positioning the automated vehicle relative to the path such that the optical system of the automated vehicle is capable of detecting the path by transmitting light onto the path and measuring light reflected from the path, the optical system being configured to generate an output in response to the path. Furthermore, the automated vehicle is configured to follow the path in response to the output generated by the optical system.

In a feature of this aspect of the invention, the step of assembling the path comprises drawing the path on a surface. In another feature, the step of assembling the path comprises assembling separate materials together, each material including a portion of the path. In yet another feature, the separate materials are individual sheets of paper. In a further feature, the method further comprises the step of printing portions of the path on the individual sheets of paper using a printer. In yet another feature, the separate materials are puzzle pieces that are attachable together.

Yet another aspect of the present invention relates to an automated vehicle. An exemplary such automated vehicle includes a vehicle body; a power source; one or more motors housed within the vehicle body and in operable connection with the power source; running gear in operable connection with the one or more motors for facilitating movement and supporting the vehicle body upon a surface; and an optical system comprising: an optical sensor for detecting light reflected from the surface and generating an output in response to the light reflected; one or more light sources, each light source capable of projecting light on the surface. Furthermore, the optical system is configured to regulate an amount of power supplied to the one or more motors in response to the output generated by the optical sensor.

In a feature of this aspect of the invention, the power source comprises one or more batteries housed within the vehicle body.

In another feature, the optical system includes a microcontroller in operable connection with the power source and the one or more motors, the microcontroller being capable of performing logic operations based on the output.

In yet another feature, the one or more motors includes a first motor and a second motor, and wherein the running gear includes a first running gear in operable connection with the first motor and a second running gear in operable connection with the second motor.

In still another feature, the optical sensor has a finite viewing area divided into a right-side viewing area and a left-side viewing area by an optical centerline, and wherein the one or more light sources includes a right-side light source configured to project light in the right-side viewing area and a left-side light source configured to project light in left-side viewing area.

In a variation of this feature, an optical barrier prevents the right-side light source from projecting light in the left-side viewing area and prevents the left-side light source from projecting light in the right-side viewing area. In another variation, the optical barrier is a shield tube at least partially enclosing the optical sensor.

In still another variation, the output relates to one or more RGB-component values of light reflected from either of the right-side viewing area or the left-side viewing area.

In yet another variation, at least one of the one or more RBG-component values of light reflected from the right-side viewing area is used to determine the amount of power supplied to a first motor of the one or more motors, and wherein at least one of the one or more RGB-component values of light reflected from the left-side viewing area is used to determine the amount of power supplied to a second motor of the one or more motors.

In another feature, the output corresponds to the intensity level of the light reflected.

In another feature, the output is a function of a brightness level of the light reflected off the surface.

In yet another feature, the output is relates to one or more RGB-component values of light reflected off the surface, and wherein the amount of power supplied to the one or more motors is a function of at least one of the one or more RGB-component values.

In still another feature, the surface includes a grayscale path.

In another feature, the surface includes a path comprising one or more colors.

In another feature, the automated vehicle further comprises a speaker configured to produce one or more sounds in response to the light reflected off the surface.

In another feature, the automated vehicle further comprises a display LED configured to be activated in response to the light reflected off the surface.

Another aspect of the present invention relates to an automated vehicle system. An exemplary such system includes a surface with a path and an automated vehicle. An exemplary such automated vehicle includes a vehicle body, a power source, one or more motors housed within the vehicle body and in operable connection with the power source, at least one running gear in operable connection with the one or more motors, a microcontroller, and an optical system in operable connection with the power source, the optical system being configured to detect the path by projecting light onto the path and measuring light reflected from the path and generate an output in response to the light reflected from the path. Furthermore, the output from the optical system is received and processed by the microcontroller, and the automated vehicle is configured to follow the path in response to the output received from the microcontroller based on the processed output from the optical system.

In a feature of this aspect of the invention, the path comprises one or more colors.

In another feature, the light reflected from the path comprises one or more RGB-component values corresponding to the intensity of red light, green light and blue light reflected by the path.

In a variation of this feature, at least one of the one or more RGB-component values, when detected by the optical system, affects the speed of the automated vehicle.

In another feature, the optical system comprises an optical sensor having a finite viewing area divided into a first side and a second side by an optical center line, and two or more light sources, at least one of the two or more light sources configured to project light to the first side of the optical center line and at least another one of the two or more light sources configured to project light to the second side of the optical center line.

In a variation of this feature, the two or more light sources emit alternately red light, green light, and blue light onto the finite viewing area, and wherein the optical sensor alternately measures the red light, green light, and blue light reflected the first side and the second side of the finite viewing area.

In a further variation of this feature, the microcontroller determines a lowest value of the red light, green light, and blue light values measured by the optical sensor and uses the lowest value to determine the speed of the automated vehicle.

In still a further variation of this feature, light reflected from the first side of the finite viewing area is used to determine the speed of a first of the one or more motors and the light reflected from the second side of the finite viewing area is used to determine the speed of a second of the one or more motors.

Another aspect of the present invention relates to an automated vehicle. An exemplary such automated vehicle includes a vehicle body, a power source comprising one or more batteries housed within the vehicle body, a first motor and a second motors housed within the vehicle body and in operable connection with the power source, a first running gear in operable connection with the first motor and a second running gear in operable connection with the second motor, the first and second running gears facilitating movement and supporting the vehicle body upon a surface, a microcontroller in operable connection with the power source, the first motor and the second motor, the microcontroller being capable of performing logic operations, and an optical system in operable connection with the microcontroller. Such an optical system includes an optical sensor for detecting light reflected from the surface and generating an output in response to the light reflected, the optical sensor having a finite viewing area divided by an optical centerline into a right-side viewing area and a left-side viewing area, a right-side light source configured to project light in the right-side viewing area, a left-side light source configured to project light in the left-side viewing area, and an optical barrier preventing the right-side light source from projecting light in the left-side viewing area and the left-side light source from projecting light in the right-side viewing area. Furthermore, the microcontroller is capable of performing logic operations based on the output. Still further, the microcontroller is configured to regulate an amount of power supplied to the first motor and the second motor in response to the output generated by the optical sensor.

Another aspect of the present invention relates to a method of following a path. An exemplary such method includes the steps of providing an automated vehicle having an optical system including an optical sensor having a finite viewing area divided by an optical centerline into a first viewing area and a second viewing area, and two or more light sources, including a first light source and a second light source; placing the automated vehicle on a surface wherein at least a portion of the path is within the finite viewing area; activating the automated vehicle to enable motion of the automated vehicle; projecting light from the first light source onto the first viewing area; detecting light reflected from the first viewing area with the optical sensor; generating a first output in response to the light reflected from the first viewing area; projecting light from the second light source onto the second viewing area; detecting light reflected from the second viewing area with the optical sensor; generating a second output in response to the light reflected from the second viewing area; determining, via the first output and the second output, the location of the path within the finite viewing area; and propelling the automated vehicle in response to the first output and second output, such that the automated vehicle moves along the path. Furthermore, at least a portion of the path remains within the finite viewing area.

In a feature of this aspect of the invention, the path comprises one or more colors. In a variation of this feature, the optical system detects the one or more colors of the path, and the automated vehicle performs one or more actions in response to the one or more colors.

In another feature of this aspect, the automated vehicle is propelled at a velocity determined by a brightness level of the portion of the path in the finite viewing area.

In addition to the aforementioned aspects and features of the present invention, it should be noted that the present invention further encompasses the various possible combinations and subcombinations of such aspects and features.

BRIEF DESCRIPTION OF THE DRAWINGS

The patent or application file contains at least one drawing executed in color. Copies of this patent or patent application publication with color drawings will be provided by the Office upon request and payment of the necessary fee.

One or more preferred embodiments of the present invention now will be described in detail with reference to the accompanying drawings, which are not necessarily to scale, wherein the same elements are referred to with the same reference numerals, and wherein:

FIG. 3A is perspective view of one of the reflective object sensors of FIG. 2B;

FIG. 3B is a top plan view of the reflective object sensor of FIG. 3A;

FIG. 3C is a side plan view of the reflective object sensor of FIG. 3A;

FIG. 3D is a bottom plan view of the reflective object sensor of FIG. 3A;

FIG. 3E is a schematic circuit diagram detailing the electronic components comprising the reflective object sensor of FIG. 3A;

DETAILED DESCRIPTION

Figure 1:
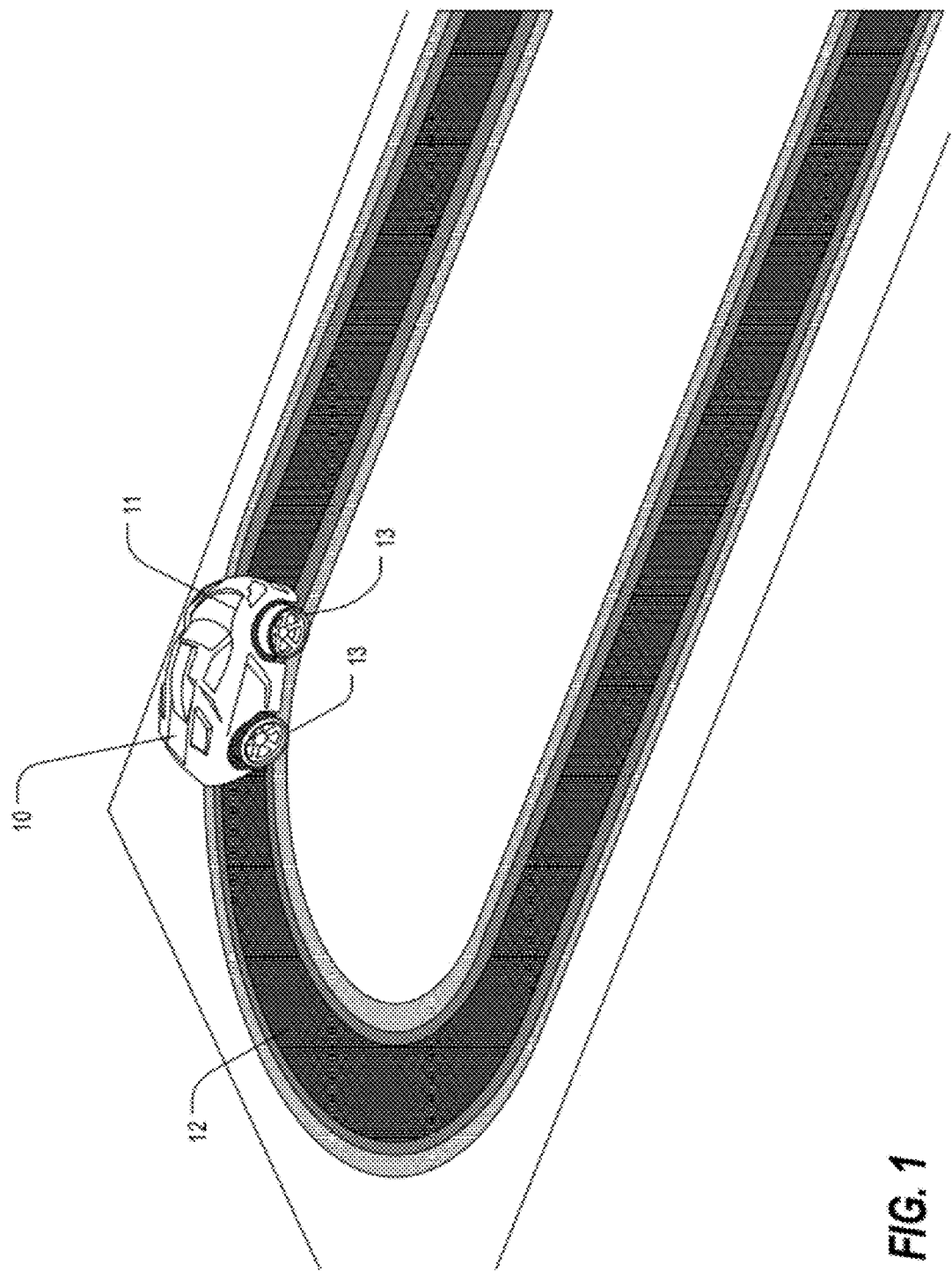
FIG. 1 is an illustration of an embodiment of an automated vehicle that uses one or more optical sensing devices to follow a gradient path.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. §112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

Turning now to the figures, FIG. 1 is an illustration of an embodiment of an automated vehicle or toy 10 that uses one or more sensing devices to follow a gradient path 12. According to one aspect of the invention, shown in FIG. 1, the automated vehicle 10 is a toy car and has the general appearance of a car, including four wheels. According to another aspect of the invention, the automated vehicle 10 has the general appearance of a toy train. According to yet another aspect of the invention, the automated vehicle 10 has the general appearance of a tank. In each such case, the automated vehicle includes a vehicle body 11 and at least one running gear 13 for supporting the vehicle and facilitating movement thereof. In various embodiments, the running gear 13 may take the form of wheels, treads, belts or various other means of facilitating movement.

It will be appreciated that the automated vehicle 10 may have any of a variety of shapes and sizes. Furthermore, it will be appreciated that the automated vehicle 10 may have the general form of a variety of different types of vehicles. In accordance with one contemplated embodiment, the automated vehicle 10 may include a vehicle body or chassis that has a detachable vehicle cover. Vehicle covers may appear in the form of a car, train, tank, or other types of vehicles. In this regard, the user may provide the automated vehicle 10 with a particular appearance by attaching a selected vehicle cover to the chassis.

As described below, when electrically activated, the automated vehicle 10 is propelled along a gradient path 12. The automated vehicle 10 is configured to stop when the gradient path 12 ends, to move at different speeds along gradient paths 12 of different shades, and to follow the gradient path 12 around curves. In at least one preferred embodiment, the automated vehicle 10 is further configured to recognize colors and perform various actions in response to those colors, including emitting sounds.

Figure 2A:
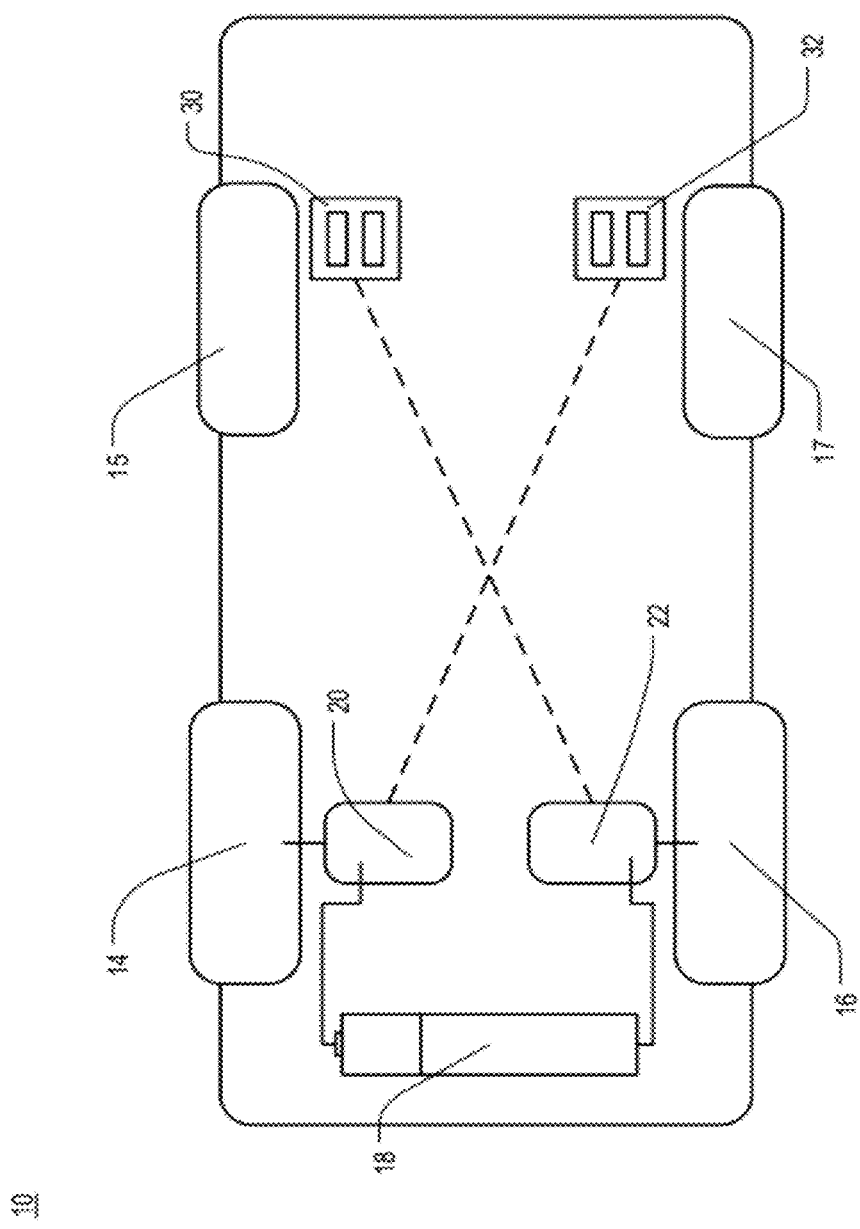
FIG. 2A is schematic illustration of an embodiment of the underside of the automated vehicle of FIG. 1.
Figure 2B:
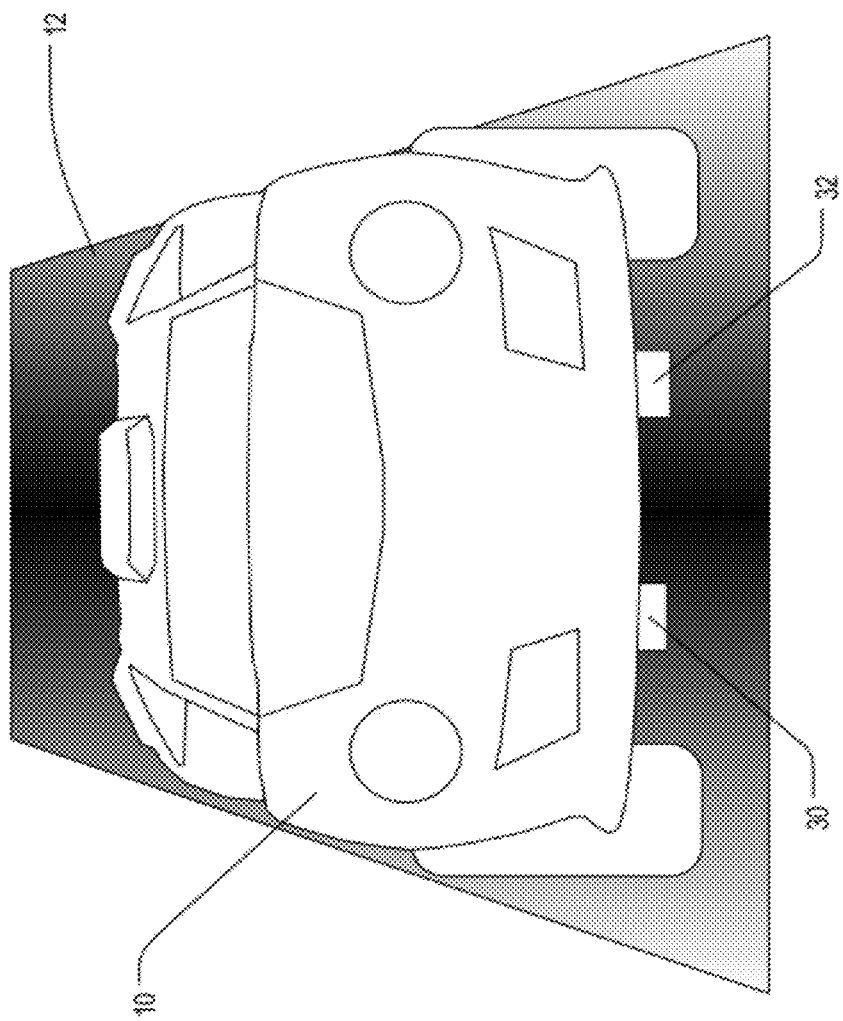
FIG. 2B is a front plan view of the automated vehicle of FIG. 2A.

FIG. 2A is a schematic drawing of the underside of an embodiment of the automated vehicle 10, and FIG. 2B is a front plan view of the automated vehicle 10 of FIG. 2A. As shown therein, the vehicle 10 includes two rear wheels 14,16, two front wheels 15,17, a battery 18, two motors 20,22, and two reflective object sensors 30,32. Upon activation, the automated vehicle 10 is driven by its rear wheels 14,16, each of which is driven by a respective motor 20,22. The right motor 20 propels the right rear wheel 14 and the left motor 22 propels the left rear wheel 16. Both motors 20,22 are powered by the battery 18. The right and left reflective object sensors 30,32 are also in circuit connection with the battery 18 and are situated near the front of the automated vehicle 10. In an alternative embodiment, the automated vehicle 10 is driven by its front wheels 15,17, each of which is driven by a respective motor 20,22. In yet another alternative embodiment, the vehicle is driven by both front 15,17 and rear wheels 14,16, each of which is driven by a respective motor.

FIGS. 3A-3D are a perspective view, a top plan view, a side plan view and a bottom plan view, respectively, of one of the reflective object sensors 30 of FIG. 2B; and FIG. 3E is a schematic circuit diagram detailing the electronic components comprising the reflective object sensor 30 of FIGS. 3A-3D. Each reflective object sensor 30,32 includes an infrared emitting diode 34 and a phototransistor, which is preferably an NPN silicon photodarlington 38, mounted together in a housing 42. In a preferred embodiment, the infrared emitting diode 34 and the phototransistor 38 that make up a particular sensor 30,32 are mounted together in a plastic housing. The on-axis radiation of the infrared emitting diode 34 and the on-axis of the response of the phototransistor 38 are both perpendicular to the face of the sensor 30,32. The photodarlington or other phototransistor 38 of each sensor 30,32 acts as a detector and responds to radiation emitted from the corresponding diode 34 when a reflective object or surface is in the field of view of the object sensor 30. In the case of the automated vehicle 10 of the present invention, when a reflective object or surface, such as a lightly shaded surface, reflects infrared light in the field of view of one of the phototransistors 38, the corresponding object sensor 30,32 reduces the flow of current to a corresponding motor 20,22. As shown schematically in FIG. 2A, the right reflective object sensor 30 controls the left motor 22 and the left reflective object sensor 32 controls the right motor 20. More particularly, the amount of light received by the right sensor 30 controls the flow of current to the left motor 22, thereby controlling propulsion of the left rear wheel 16, and the amount of light received by the left sensor 32 controls the flow of current to the right motor 20, thereby controlling propulsion of the right rear wheel 14.

Figure 4A:
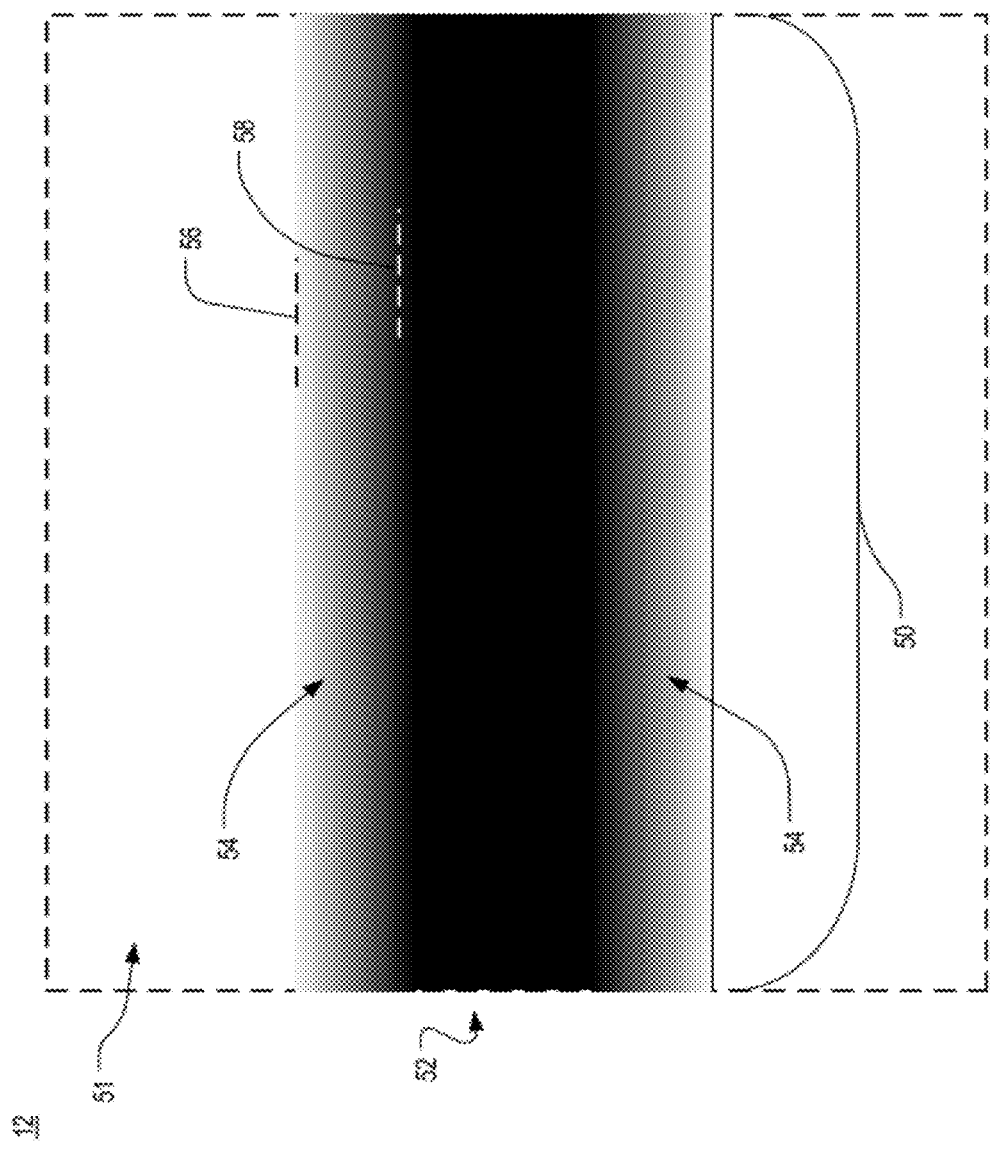
FIG. 4A is a top plan view of a portion of a gradient path for use with the automated vehicle of FIG. 1.

FIG. 4A is a top plan view of a portion of a gradient path 12 for use with the automated vehicle 10 of FIG. 1. The gradient path 12 is a dark line segment 50 printed on a light background 51. The dark segment 50 includes a solid dark center band portion 52, and two variable shade side band portions 54, or shoulders, that are adjacent to the solid center band portion 52. Each variable shade side band portion 54 has both an outer edge 56 and an inner edge 58, each represented in FIG. 4A by a dashed line. The inner edge 58 is the same dark shade as the solid center band portion 52. The outer edge 56 is the same light shade as the light background 51. Between the inner edge 58 and the outer edge 56, the side band portion 54 gradually changes in shading, gradually becoming darker towards the inner edge 58. This gradual change in shading defines an optical gradient, wherein the narrower the width of the side band portion 54, the more extreme the gradient is considered to be. At its most extreme, the width of the side band portion is zero, wherein the gradient path is defined by a solid dark center band portion printed on a light background. Generally, the side band portions 54 of the gradient path 12 can be varied to control the response and steering of the automated vehicle 10, and both the center band portion 52 and the side band portions 54 of the gradient path 12 can be shaded lighter or darker to control speed, all as described in greater detail hereinbelow.

Figure 4B:
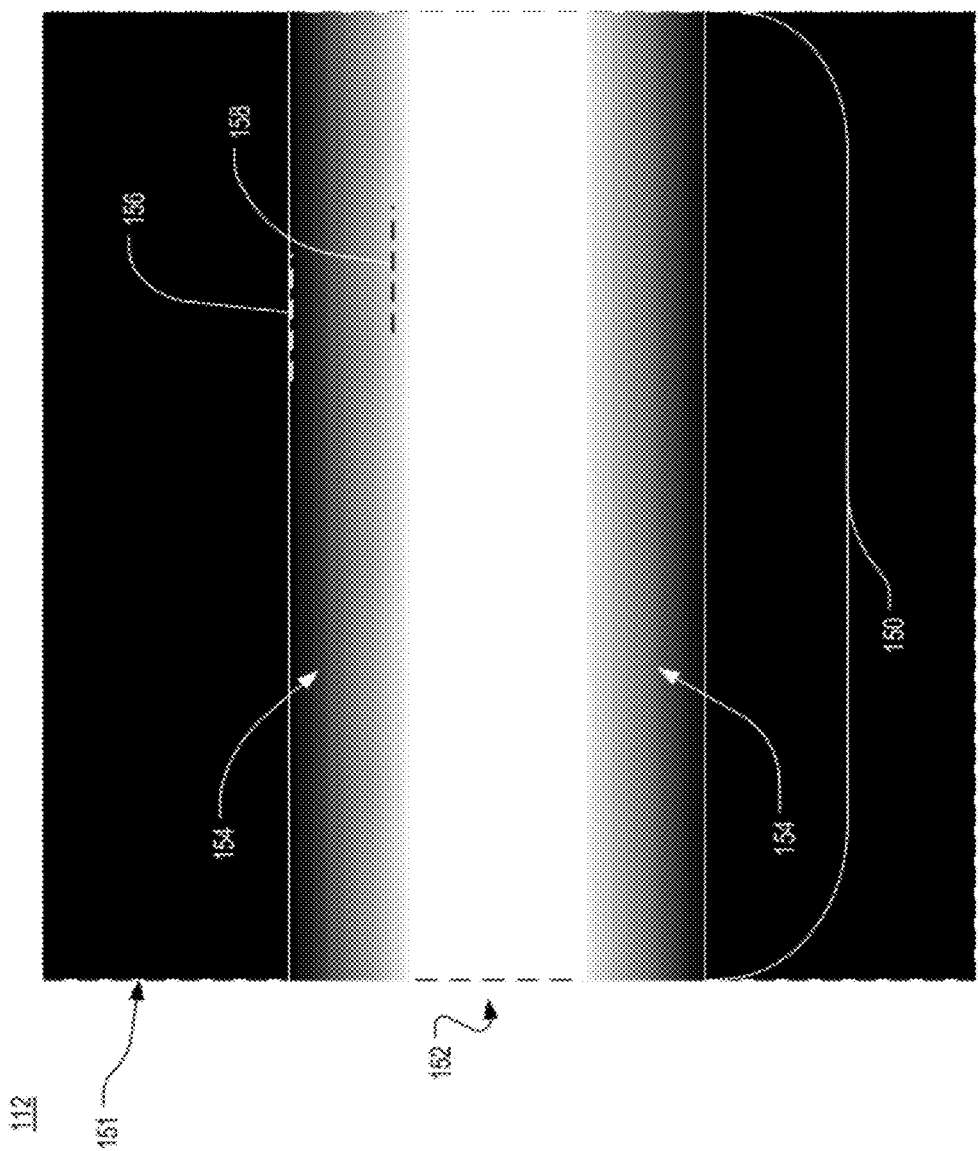
FIG. 4B is a top plan view of a portion of a reverse gradient path for use with an automated vehicle.

FIG. 4B is a top plan view of a portion of a reversed gradient path 112 for use with an automated vehicle that detects a gradient path. In accordance with this embodiment, the gradient path 112 is a light line segment 150 printed on a dark background 151. The light segment 150 includes a solid light center band portion 152, and two variable shade side band portions 154, or shoulders, that are adjacent to the solid center band portion 152. Each variable shade side band portion 154 has both an outer edge 156 and an inner edge 158, each represented in FIG. 4B by a dashed line. The inner edge 158 is the same light shade as the solid center band portion 152. The outer edge 156 is the same dark shade as the dark background 151. Between the inner edge 158 and the outer edge 156, the side band portion 154 gradually changes in shading, gradually becoming lighter towards the inner edge 158. This gradual change in shading defines an optical gradient, wherein the narrower the width of the side band portion 154, the more extreme the gradient is considered to be. Generally, the side band portions 154 of the gradient path 112 can be varied to control the response and steering of the automated vehicle, and both the center band portion 152 and the side band portions 154 of the gradient path 112 can be shaded lighter or darker to control speed.

Figure 4C:
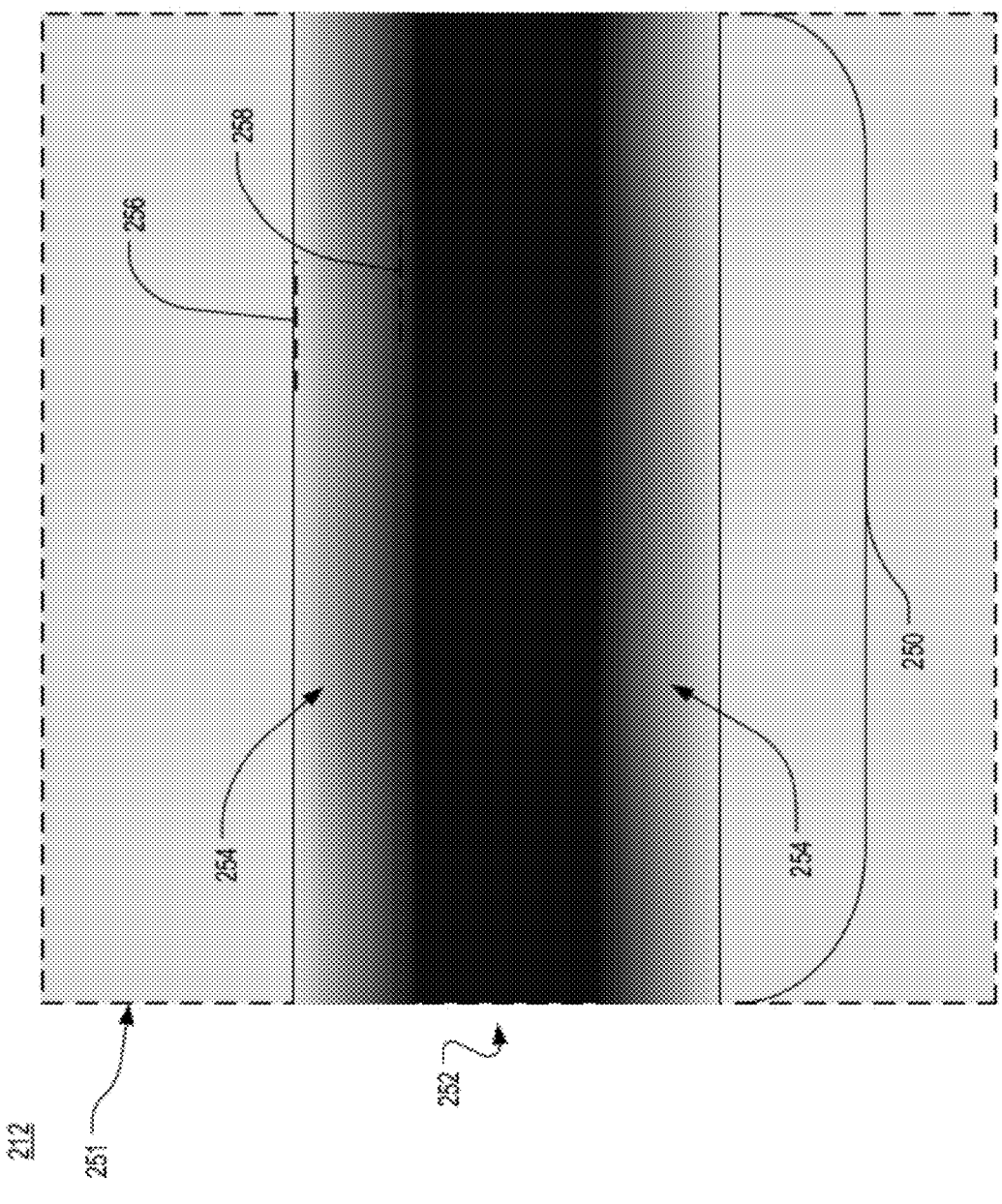
FIG. 4C is a top plan view of a portion of a color gradient path for use with the automated vehicle of FIG. 1.

FIG. 4C is a top plan view of a portion of a colored gradient path 212 for use with the automated vehicle 10 of FIG. 1. In accordance with this embodiment, various colors are used to establish a gradient. Any of a range of possible colors and color combinations may be used to establish the gradient. In a preferred embodiment, at least one color is relatively light and at least one color is relatively dark. As shown in FIG. 4C, the gradient path 212 is a dark-colored line segment 250 printed on a light-colored background 251. The dark-colored segment 250 includes a solid dark-colored center band portion 252, and two variable colored side band portions 254, or shoulders, that are adjacent to the solid center band portion 252. Each variable colored side band portion 254 has both an outer edge 256 and an inner edge 258, each represented in FIG. 4C by a dashed line. The inner edge 258 is the same dark color as the solid center band portion 252. The outer edge 256 is the same light color as the light-colored background 251. Between the inner edge 258 and the outer edge 256, the side band portion 254 gradually changes in color, gradually becoming darker towards the inner edge 258. This gradual change in color defines an optical gradient, wherein the narrower the width of the side band portion 254, the more extreme the gradient is considered to be. At its most extreme, the width of the side band portion is zero, wherein the gradient path is defined by a solid dark-colored center band portion printed on a light background. Generally, the side band portions 254 of the gradient path 212 can be varied to control the response and steering of the automated vehicle 10, and both the center band portion 252 and the side band portions 254 of the gradient path 212 can be colored lighter or darker to control speed.

A further alternative to the gradient path shown in FIG. 4A is a gradient utilizing gradually changing wavelengths of light that include, but are not limited to, the visible spectrum, the ultraviolet spectrum and the infrared spectrum. This alternative may thereby expand the application of the automated vehicle by allowing an automated vehicle to detect and follow infrared and/or ultraviolet light wavelengths. The automated vehicle can be configured to detect wavelengths of light, including infrared and ultraviolet, that are generally not visible to the human eye. When the automated vehicle follows a gradient comprised of such wavelengths, the automated vehicle appears as if it is not following any track at all. A gradient comprised of such wavelengths of light may be established with the use of infrared and ultraviolet inks, such as those used in connection with printing materials.

A further alternative track for an automated vehicle includes an electroluminescent panel. In such an embodiment, the track is constructed on an electroluminescent panel which internally illuminates and emits light. The automated vehicle, configured to receive light, rather than emit and receive light, follows the lighted path on the electroluminescent panel. The entire track could be lightened or darkened to control the speed of the vehicle by adjusting the intensity of the light emitted by the electroluminescent panel.

Figure 5:
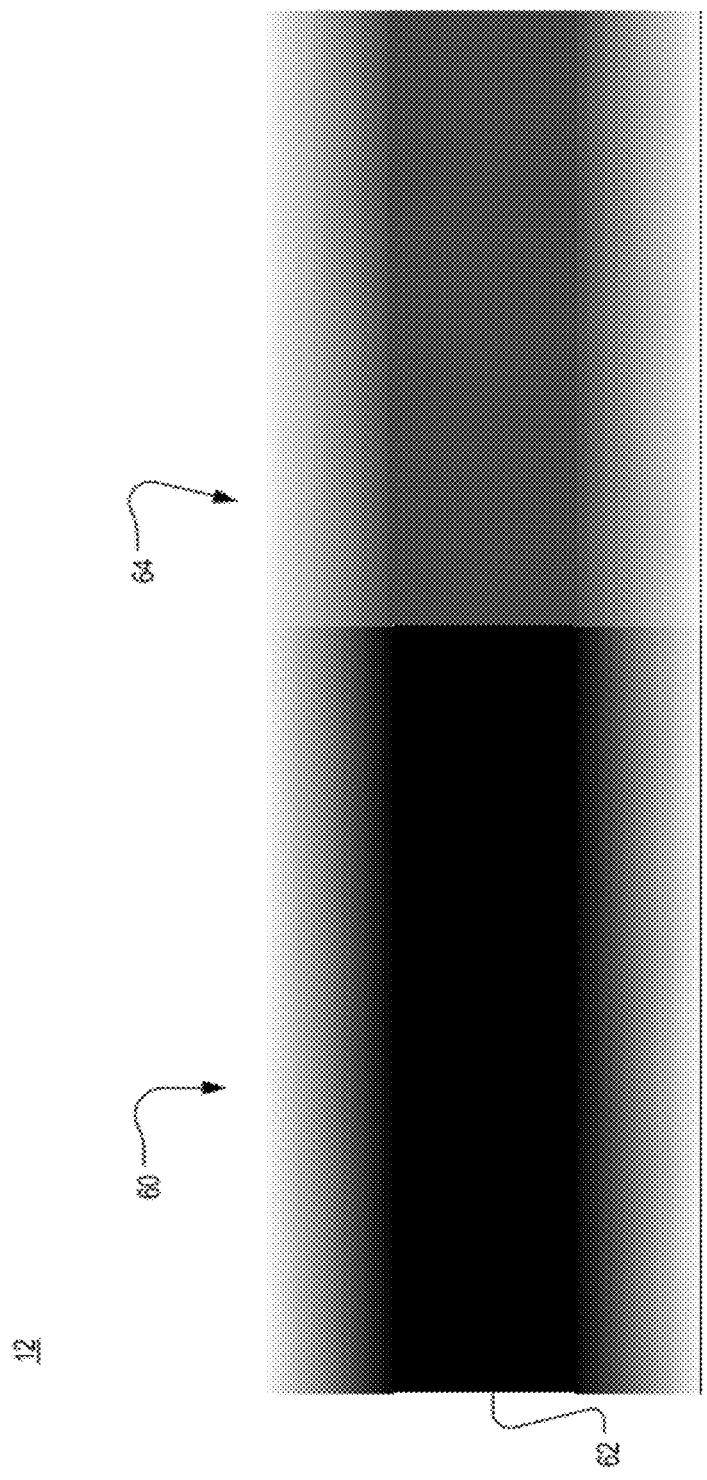
FIG. 5 is a top plan view of a portion of a gradient path that permits the automated vehicle to achieve different speeds.

FIG. 5 is a top plan view of a portion of a gradient path 12 that permits the automated vehicle 10 to achieve different speeds. Two segments 60,64 of the gradient path 12 are depicted. A higher speed segment 60 has a solid center band 62 that is of a darker shade than that of a lower speed segment 64. The automated vehicle 10 is configured to recognize different shades of path and to respond by supplying more power to the motors 20,22 when positioned above darker shades and less power to the motors 20,22 when above lighter shades. Hence, the rear wheels 14,16 turn faster when the automated vehicle 10 is positioned above the high speed segment 62 than when positioned above the low speed segment 64. As will be appreciated by the Ordinary Artisan, the degree of shading of the gradient path 12 may be varied as desired in order to adjust the corresponding speed of the automated vehicle 10 when positioned thereon. For example, when positioned above a path with the darkest possible shading (i.e., black), the automated vehicle 10 is configured to operate at maximum speed. Conversely, when the automated vehicle 10 is positioned above a path with no shading (i.e. white), it is configured to come to a complete stop. Speed will vary accordingly as the vehicle is positioned above gradient paths with various degrees of shading.

Figure 6:
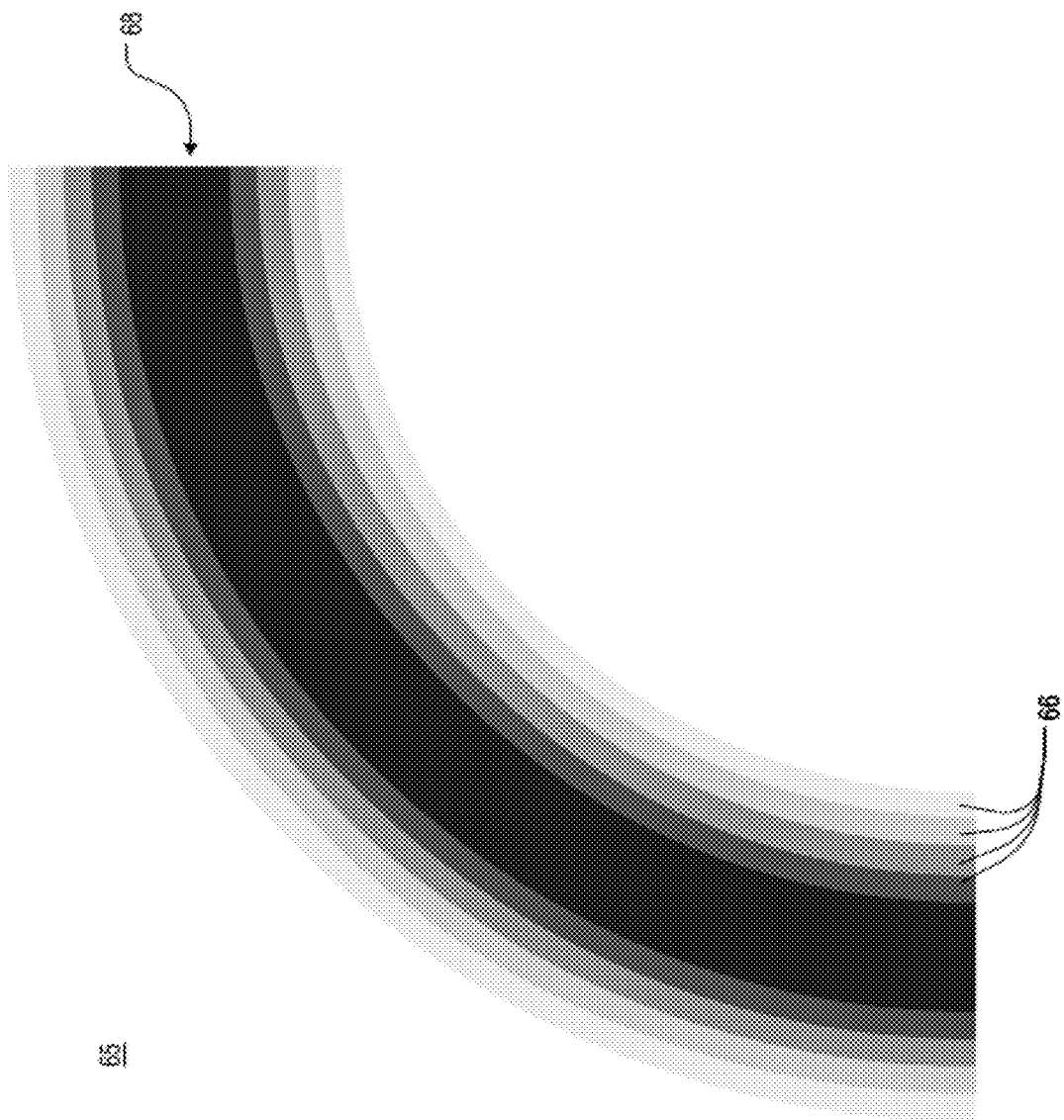
FIG. 6 is a top plan view of a curved portion of a gradient path for use with the automated vehicle of FIG. 1.

FIG. 6 is a top plan view of a curved portion of a gradient path 12 for use with the automated vehicle 10 of FIG. 1. The automated vehicle 10 is aligned generally parallel to an axis running from the front to the rear of the automated vehicle 10. The curvature of the gradient path 12 allows the automated vehicle 10 to change its course as desired. Advantageously, shading in the gradient path 12 allows the automated vehicle 10 to smoothly steer around the curve in the gradient path 12. A gradient path 12 that changes from darker to lighter shades over a shorter width produces a quicker response by the automated vehicle 10 to the curvature of the gradient path 12, thereby leading to a rougher, jerkier turn. A less extreme, or more gradual, gradient path that changes from darker to lighter shades over a wider distance, elicits a slower and more gradual response by the automated vehicle 10, and hence, a smoother turn.

FIG. 6 further displays an alternative embodiment of the gradient path 65, wherein the gradient is discrete, rather than continuous. This embodiment of the gradient path 65 includes a plurality of shaded bands 66. The center band 68 is a dark solid shade, similar to the solid dark center band portion 52 shown in FIG. 4. However, instead of the shading transitioning from dark to light over a continuous spectrum, this gradient path 65 has a plurality of discrete shaded bands 66, each of slightly different shades. Moving out from the center band, each successive adjacent band is of a lighter shade. Collectively, these multiple bands 66 serve to reflect light in a manner similar to the side band portions 54 of the segment 50 of FIG. 4.

Figure 7A:
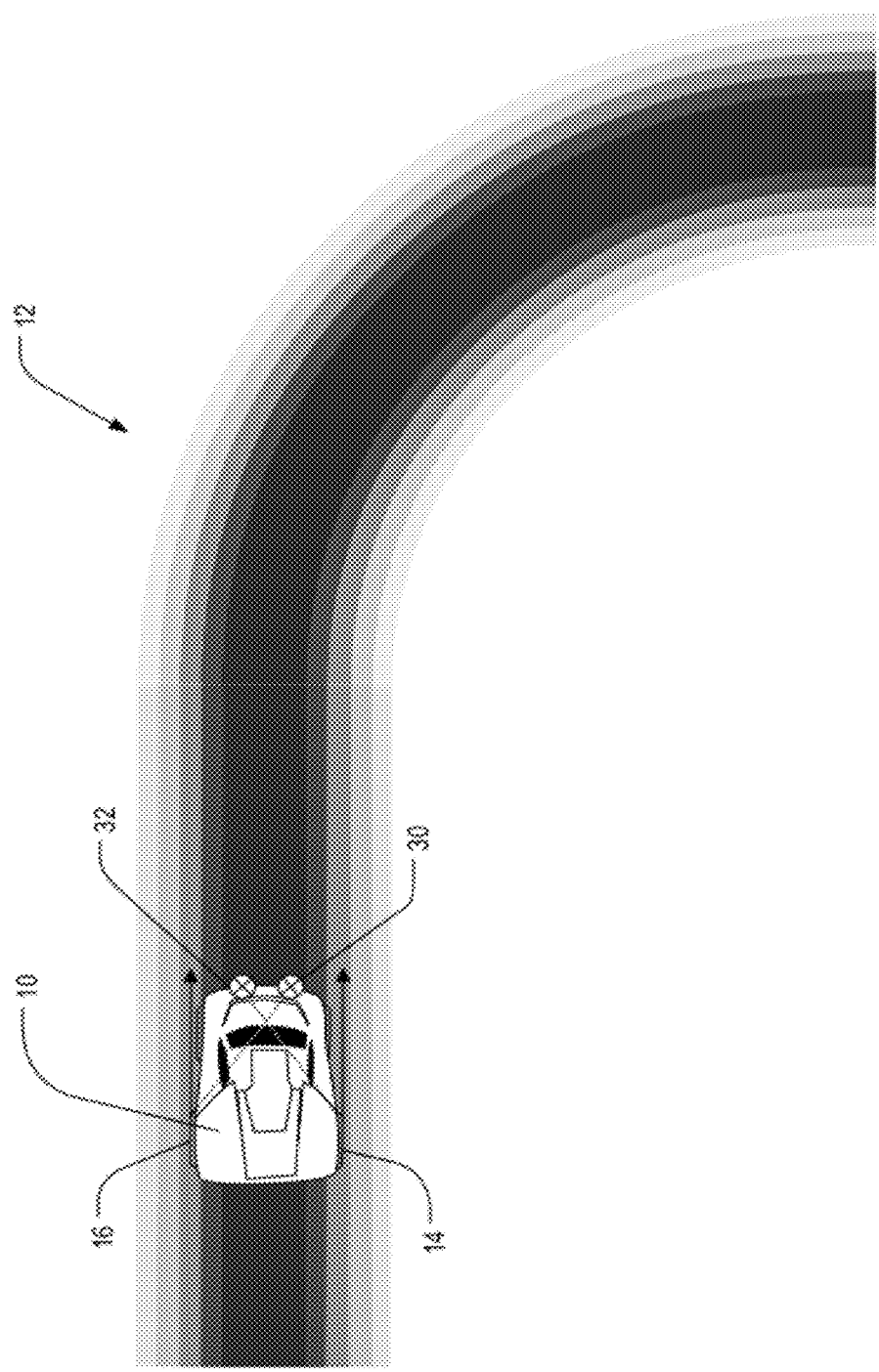
FIGS. 7A-7D are schematic illustrations depicting the automated vehicle executing a turn over a curved portion of gradient path like that of FIG. 6.

FIGS. 7A-7D are schematic illustrations depicting the automated vehicle 10 executing a turn over a curved portion of gradient path 12 like that of FIG. 6. The automated vehicle 10 is configured to turn by independently altering the speed of the wheels 14,16 in response to the shade of the gradient path 12 as recognized by the reflective object sensors 30,32. As illustrated in FIG. 7A, initially, the automated vehicle 10 is moving in a straight path along a gradient path 12. The sensors 30,32 are shown schematically, with their relative size being representative of the amount of light being reflected back from the surface on which the vehicle 10 travels. Furthermore, the direction of travel is shown by arrows extending forward from the rear wheels 14,16, with the length of each arrow being representative of the speed of the respective wheel.

Figure 7B:
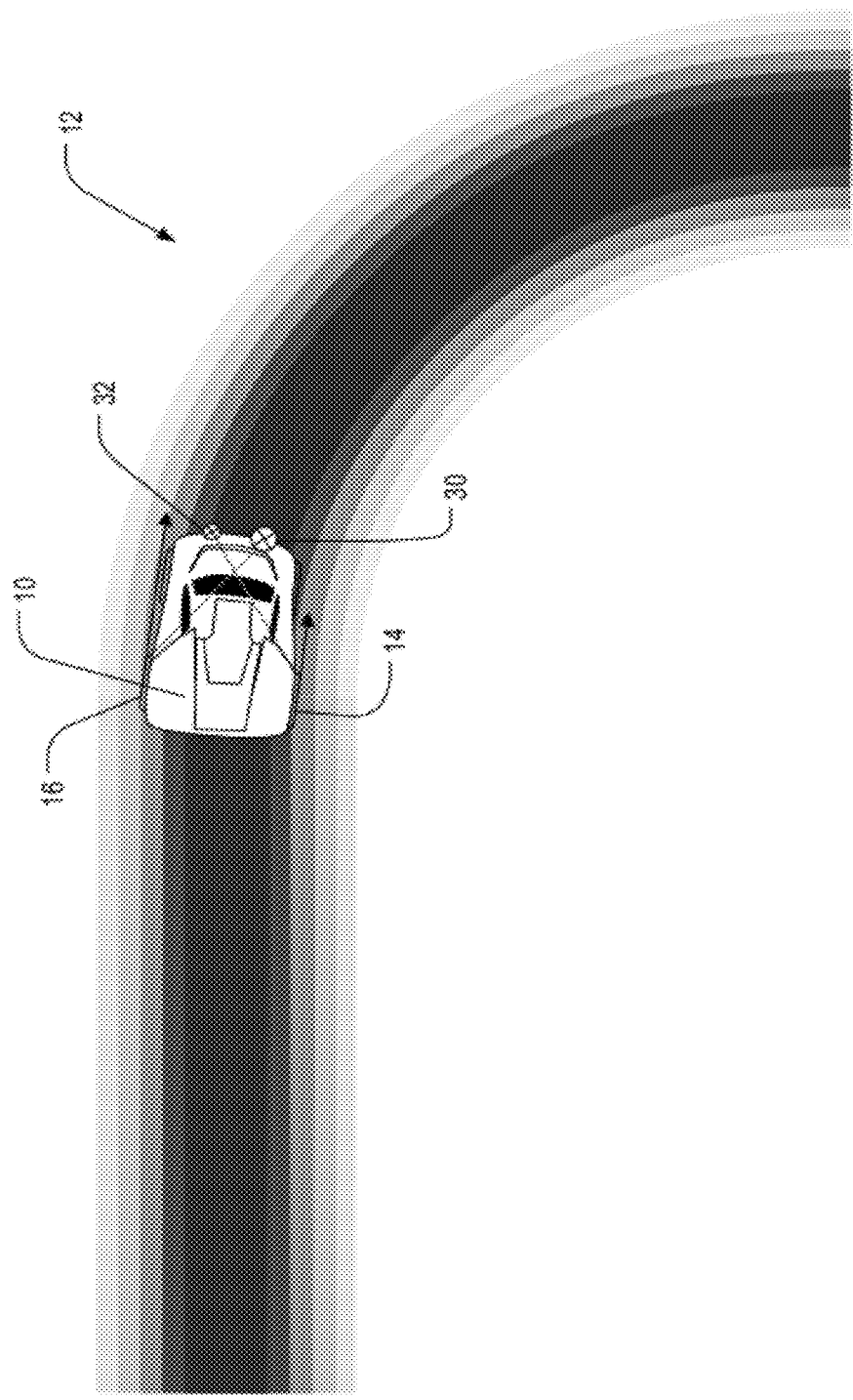
Figure 7C:
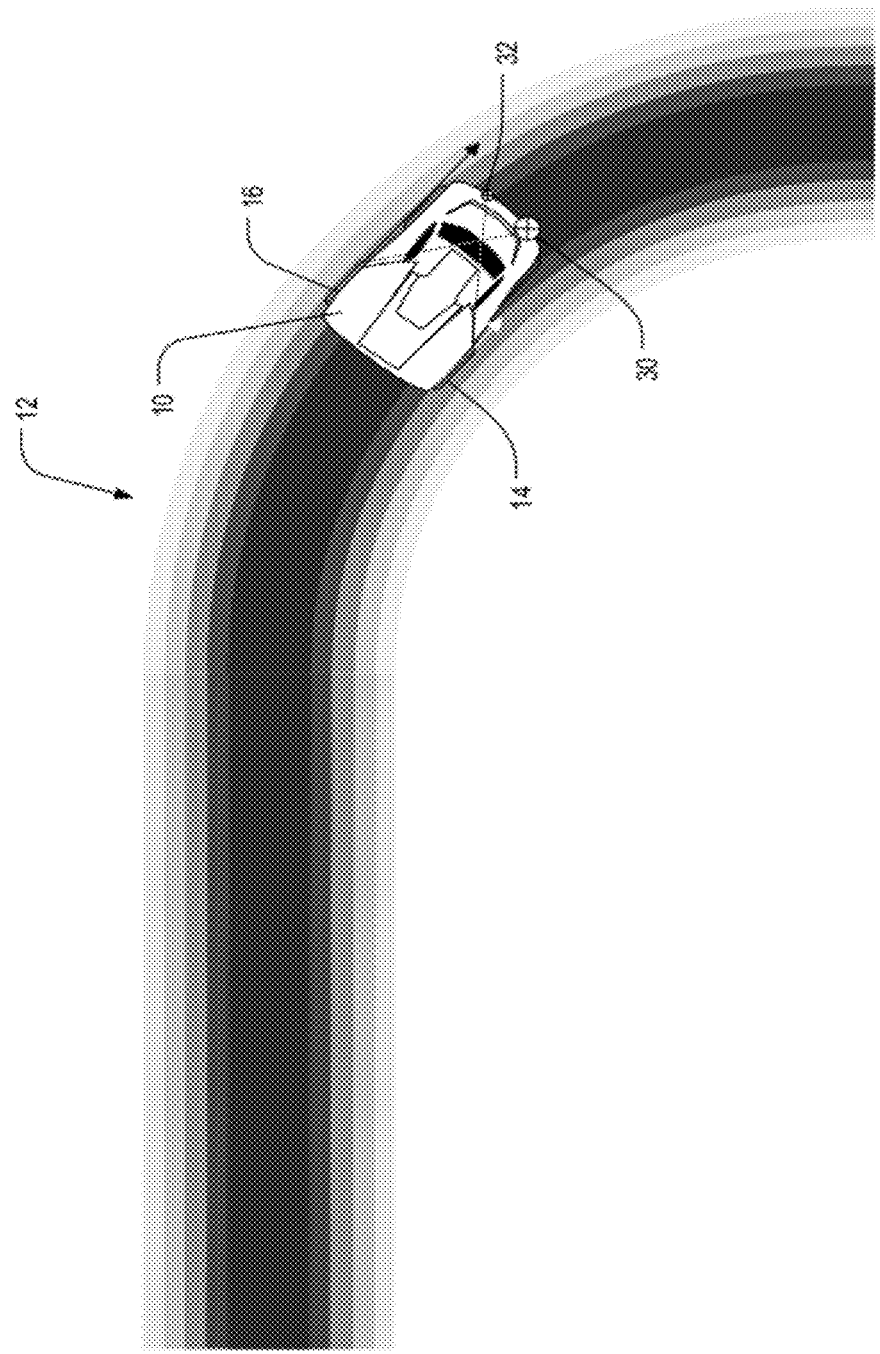
Figure 7D:
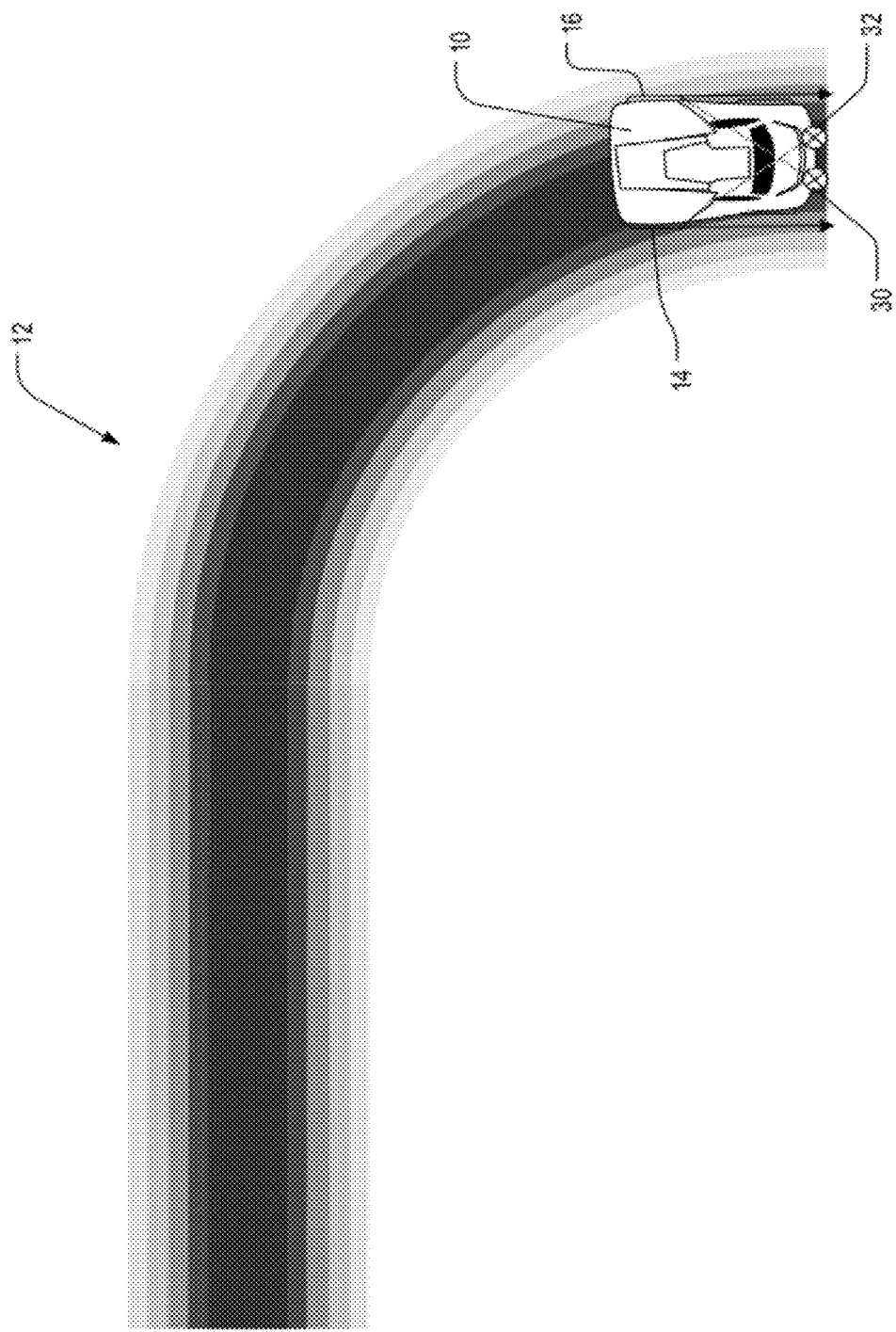

As the vehicle 10 continues forward, it encounters a section of the path 12 that curves to the right. As shown in FIG. 7B, the automated vehicle 10 initially continues straight ahead in such a manner that the left reflective object sensor 32 moves onto a portion of track that is of a lighter shade, causing the left sensor 32 to detect an increased level of reflected light. Resultingly, the left sensor 32 decreases the power supplied to the right motor 20, reducing the speed at which the right wheel 14 is spinning. The left sensor 32 is shown in FIG. 7B as reduced in size relative to the right sensor 30, representing the increased amount of reflected light being received by the left sensor 32, and the right arrow is shown as shorter in length relative to the left arrow, representing the slower speed at which the right wheel 14 is spinning. At this point the left wheel 16 is spinning faster than the right wheel 14 and the automated vehicle 10 begins to turn towards the right, following the gradient path 12. The automated vehicle 10 continues in such a manner, following the curve of the gradient path 12, adjusting its location along the gradient by varying the power to the motors 20,22, and thus the speed of the wheels 14,16. As shown in FIG. 7C, operation of the automated vehicle 10 continues as initiated at the beginning of the curve, until the automated vehicle 10 reaches the approximate position shown in FIG. 7D. At this point, each sensor 30,32 again receives an approximately equal amount of reflected light (as represented by their similar size in FIG. 7D), causing the left and right wheels 16,14 to spin at the same rate again (as represented by the similar length of the arrows), propelling the automated vehicle 10 in a straight line.

Figure 8:
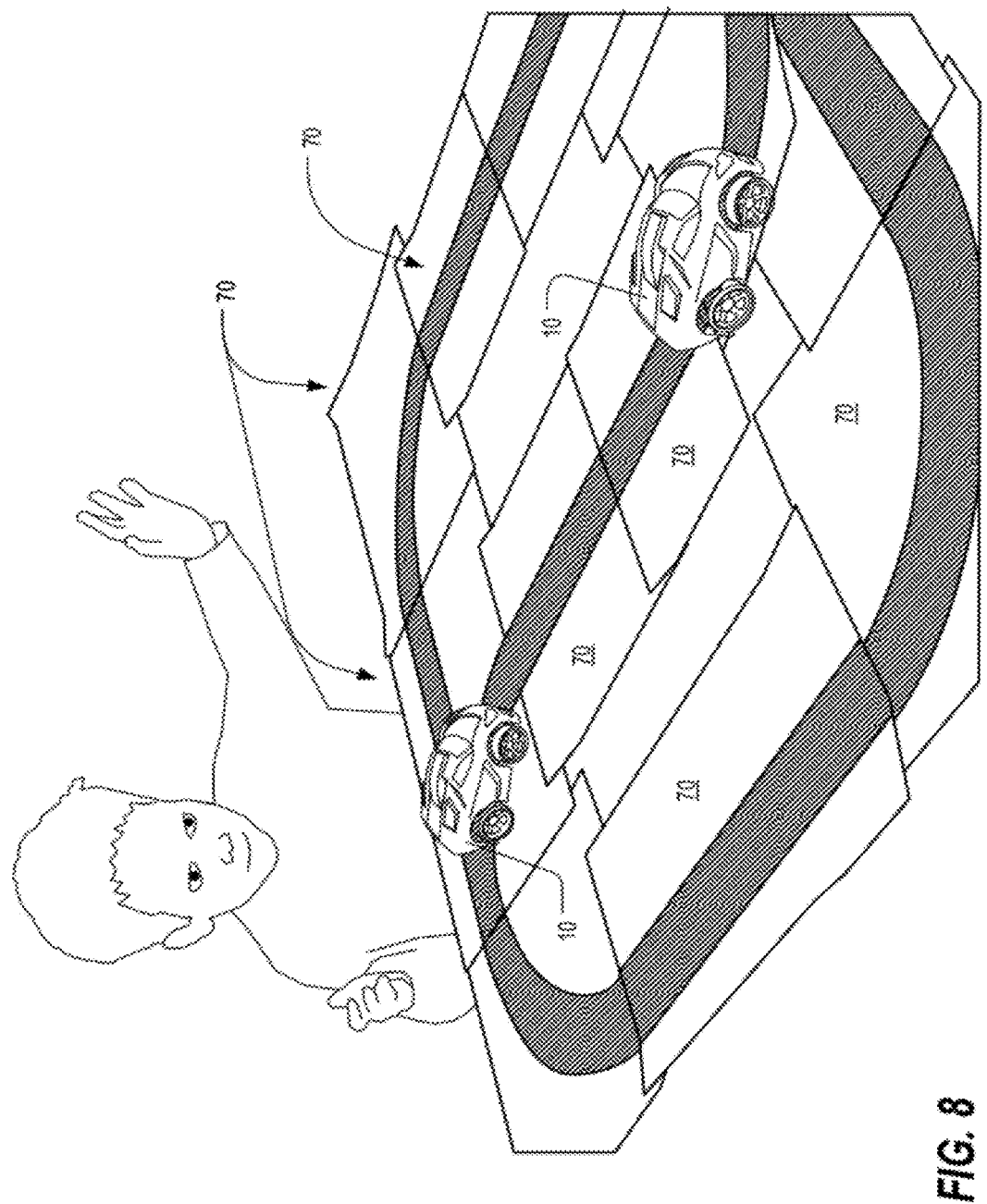
FIG. 8 is an illustration depicting the automated vehicle in use on printed gradient path sheets.

FIG. 8 is an illustration depicting the automated vehicle 10 in use on printed gradient path sheets 70. In at least one contemplated embodiment, users may purchase gradient path sheets 70 to assemble according to pre-conceived designs, so as to resemble popular race tracks. Users may also assemble gradient path sheets 70 pages in creative ways, designing their own race tracks, such as to include merging and crossing track segments, and track segments of varying speeds. Furthermore, in at least one embodiment, users may design and print out their own gradient path sheets 70. Any printer generally available to consumers is capable of printing gradient path sheets 70 for use by the automated vehicle 10. The gradient path sheets 70, themselves, may be downloaded via the Internet or created by any number of computer programs capable of drawing gradient line segments. Gradient path sheets 70 can be affixed to one another or to an underlying surface in any of a variety of ways. Portions of a gradient path can be glued or otherwise attached to the surface beneath the sheets. Gradient path sheets 70 may be taped, glued, or stapled to one another. In another contemplated embodiment, the gradient path 12 may be deposited onto one or more gradient path sheets 70 or onto another surface with a dispenser. In this regard, the gradient path 12 may have an adhesive underside for adhering to the gradient path sheet 70 or other surface. When housed in the dispenser, such as a conventional tape dispenser, the gradient path 12 takes the form of a roll, which may be unwound and removed from the dispenser by the user. The user may then configure the unwound gradient path to be adhered to the gradient path sheet 70 or other surface in any desired arrangement.

Figure 9A:
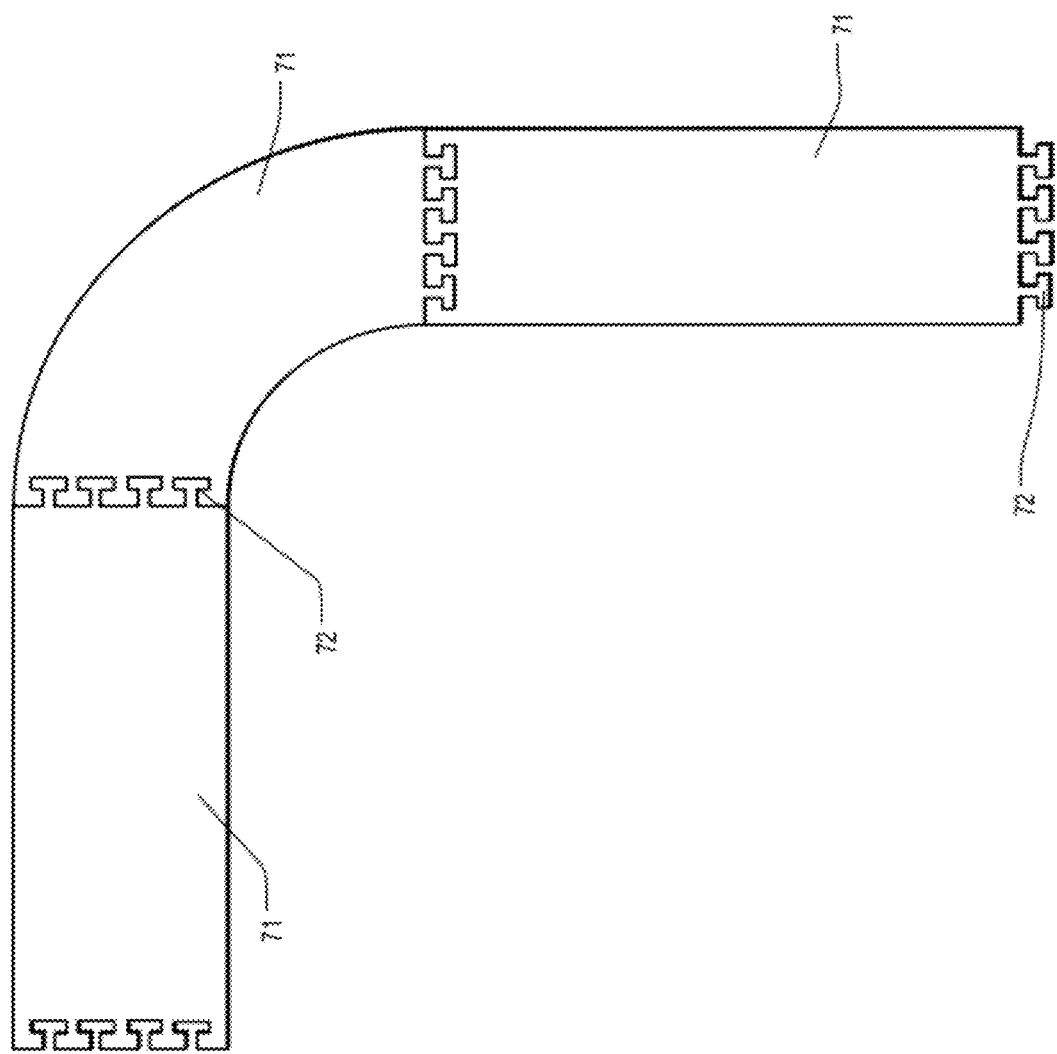
FIG. 9A is a top plan view of separate gradient track components affixed to one another with interlocking notches situated at both ends of each component.

FIG. 9A is a top plan view of separate gradient track components 71 affixed to one another with interlocking notches and tabs 72 situated at both ends of each component 71. In FIG. 9A, each track component 71 of the gradient path may be formed from cardboard or another thicker, more rigid material than paper, that includes ends with notches and tabs 72 that allow separate pieces of track components 71 to interlock and affix to one another, similar to the manner in which puzzle pieces are connected to one another. FIG. 9A is also illustrative of a method of assembling a gradient path by affixing individual pieces of path or track components 71 that include interlocking notches and tabs 72.

Figure 9B:
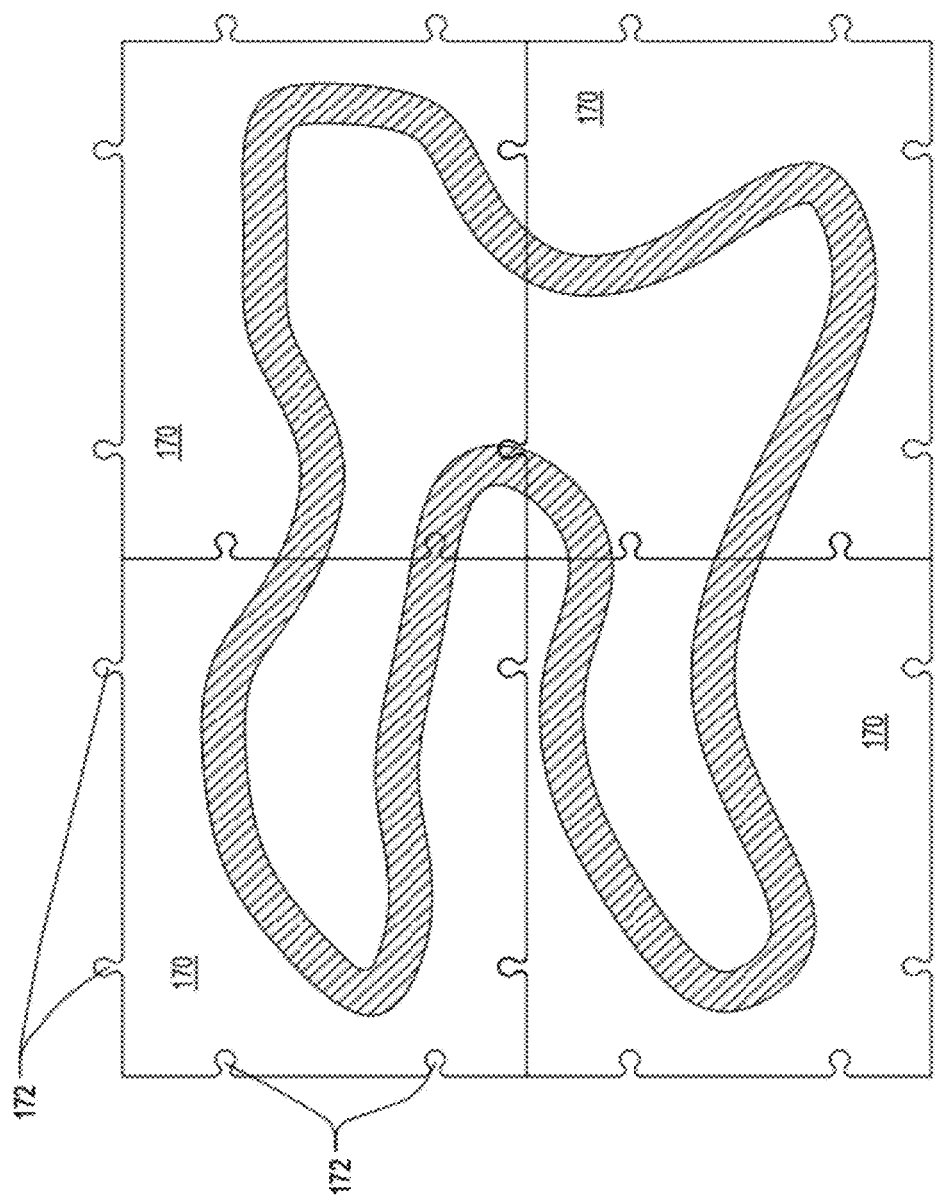
FIG. 9B is a top plan view of separate gradient path sheets affixed to one another with interlocking notches situated on one or more sides of each sheet.

FIG. 9B is a top plan view of four separate gradient path sheets 170 affixed to one another by means of interlocking notches 172 situated on one or more sides of each sheet 170. The sheets 170 may be formed from cardboard or another thicker, more rigid material than paper that includes notches or tabs 172 that allow the separate sheets 170 to interlock and affix to one another, similar to the manner in which puzzle pieces are connected to one another. In accordance with FIG. 9B, two notches 172 may be situated on each of four sides. Two of the sides have male notches, and the remaining two sides have female notches, thereby allowing a user to assemble the gradient path sheets 170 in a variety of configurations.

Figure 10:
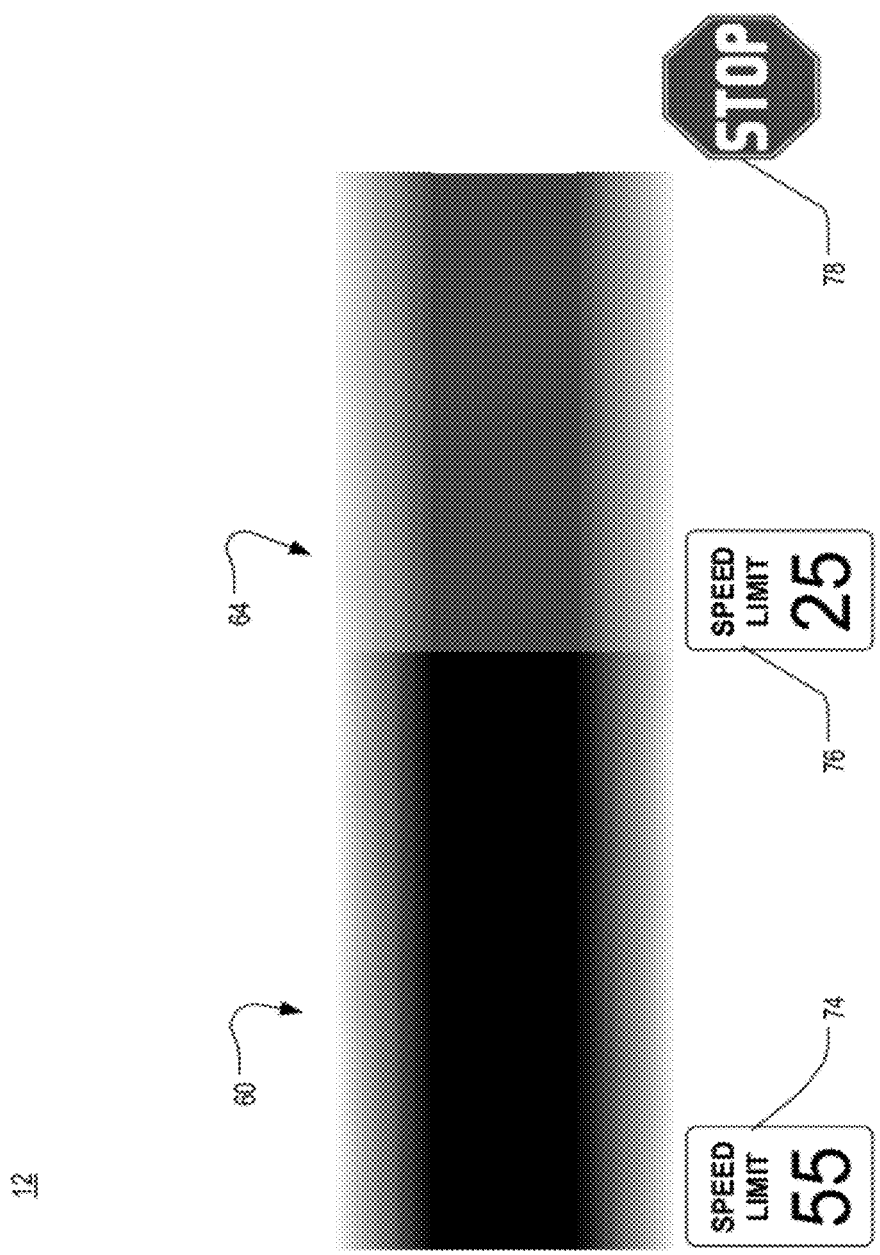
FIG. 10 is a top plan view of a surface with segments of optical gradient paths of varying speeds and various road signs.

FIG. 10 is a top plan view of a surface having segments of optical gradient paths of varying speeds 60,64 and various corresponding road signs 74,76,78. The road signs are incorporated into a surface containing the gradient path to indicate respective speeds of the corresponding gradient paths and to add to the entertainment value of playing with the automated vehicle 10. The high-speed speed limit sign 74 is adjacent to the high-speed segment of optical gradient path 60, thus indicating that the automated vehicle 10 is configured to move along the gradient path 60 at a high speed. Likewise, the low-speed speed limit sign 76 is adjacent to the low-speed segment of optical gradient path 64, indicating that the automated vehicle 10 is configured move along the gradient path 64 at a slower speed. Finally, the stop sign 78 is used to indicate that the automated vehicle 10 is configured come to a stop when the gradient path 64 ends.

Figure 11A:
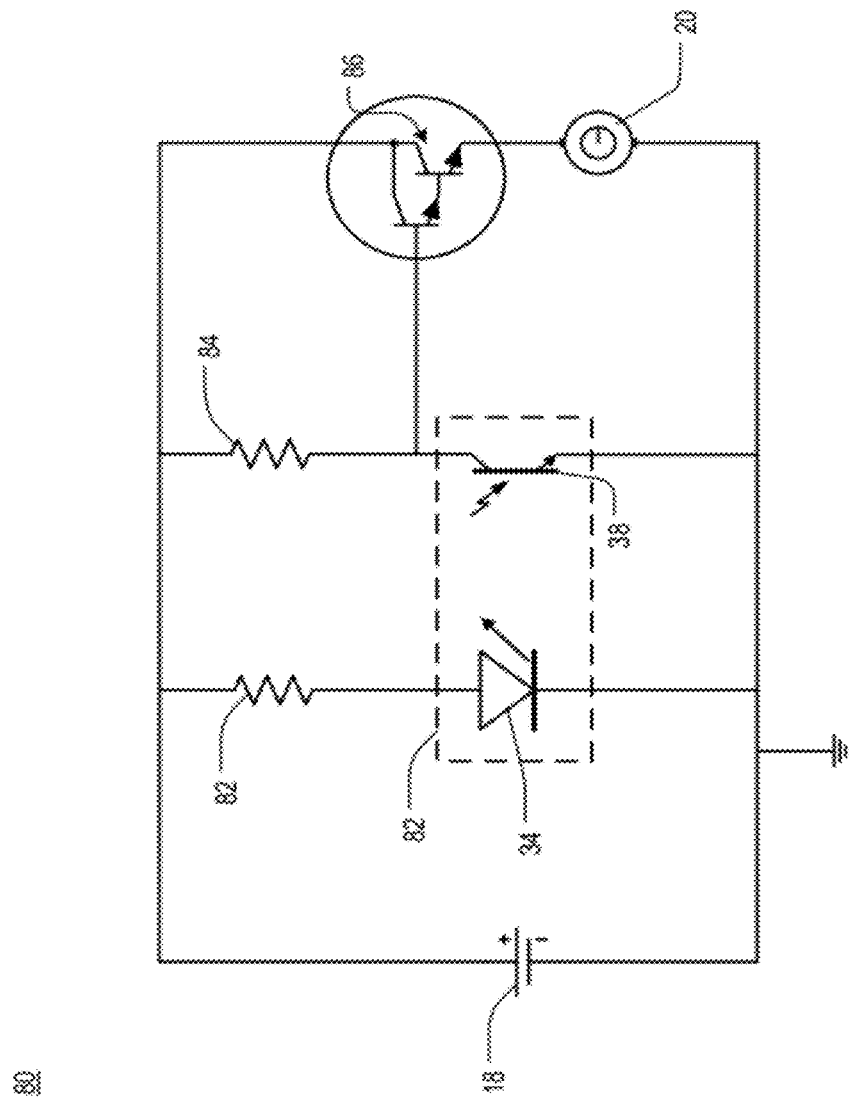
FIG. 11A is a schematic diagram of a circuit for controlling one of the motors of FIG. 2A in accordance with one or more preferred embodiments.

FIG. 11A is a schematic diagram of a circuit 80 for controlling one of the motors 20 of FIG. 2A in accordance with one or more preferred embodiments. A similar circuit 80 may be utilized for controlling the other of the motors 22. As shown therein, the motor 20 is connected in parallel with the diode 34 and phototransistor 38 of the appropriate reflective object sensor 32. Resistors 82,84 of appropriate values may be used to drop the voltage from the battery 18 to necessary levels for the diode 34 and phototransistor 38. Another transistor 86, which is preferably a high current gain transistor, is used to link the phototransistor 38 to the motor 20. In one specific implementation, the battery 18 is a 4.5V battery, a first resistor 82 has a resistance of 300Ω, a second resistor 84 has a resistance of 3.9 kΩ, the motor 20 is a 1.5-3V motor, the phototransistor 38 is an NPN silicon photodarlington transistor, the diode 34 and phototransistor 38 are packaged together as a QRD1114-type reflective object sensor as shown in FIGS. 3A-3E, and the transistor 86 is a 2N6426-type darlington transistor.

Figure 11B:
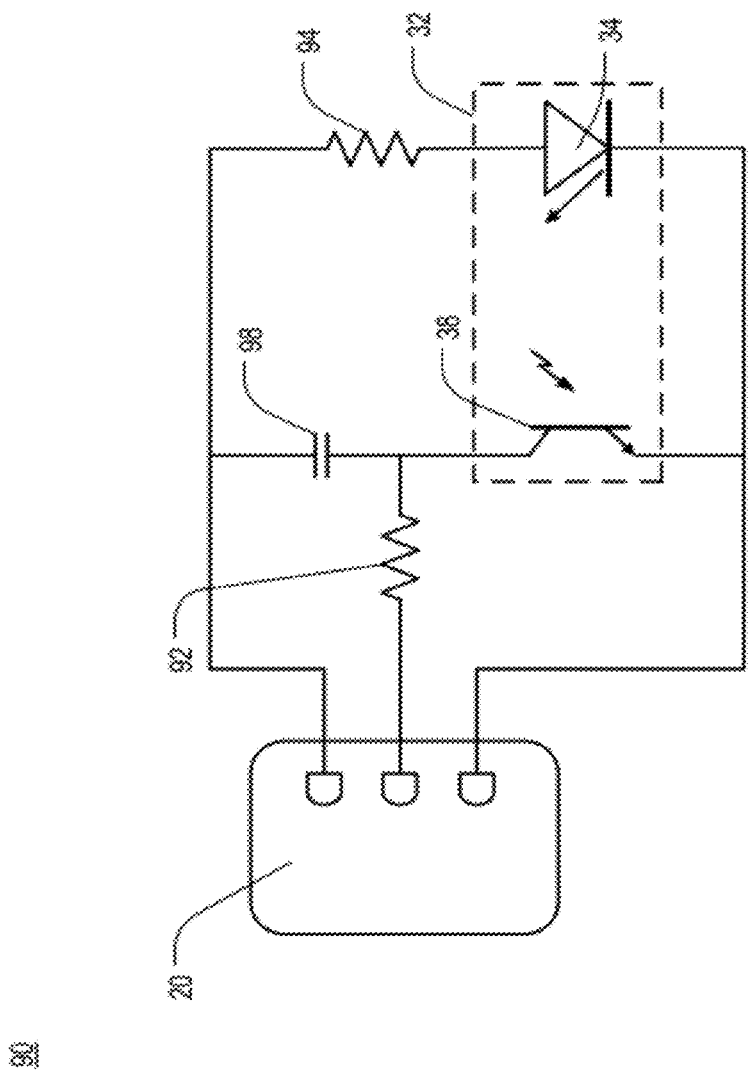
FIG. 11B is a schematic diagram of an alternative circuit for controlling one of the motors of FIG. 2A in accordance with one or more preferred embodiments.

FIG. 11B is a schematic diagram of an alternative circuit 90 for controlling one of the motors 20 of FIG. 2A in accordance with one or more preferred embodiments. In addition to the diode 34 and phototransistor 38 described previously, this circuit 90 includes two resistors 92,94 and a capacitor 98. In one specific implementation, the first resistor 92 has a resistance of 220Ω, the second resistor 94 has a resistance of 470Ω, the capacitor 98 has a capacitance of 0.01 μF, and the motor 20 is a 1.5-3V motor providing 6990-9100 RPM and drawing 0.66 A of current. Other alternative circuits, including circuits having alternate components and circuits providing more sophisticated operation, will be apparent to the Ordinary Artisan.

Figure 12A:
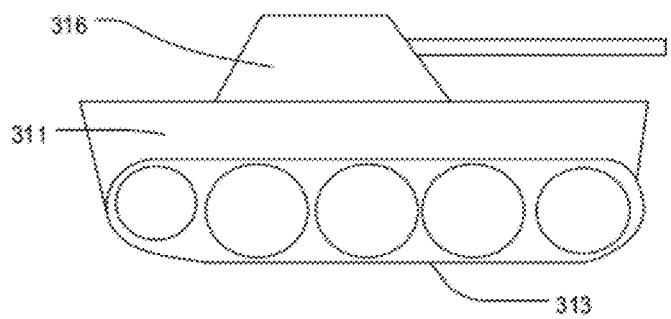
FIG. 12A is a schematic illustration of a side view of an alternate embodiment of an automated vehicle that uses optical sensors and internal digital circuitry to follow lines of various colors and emit responses specific to the color of line being followed.
Figure 12B:
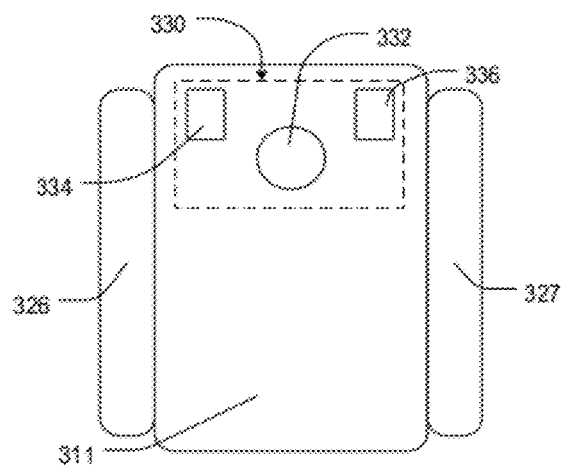
FIG. 12B is a schematic illustration of a bottom view of the automated vehicle of FIG. 12A.
Figure 12C:
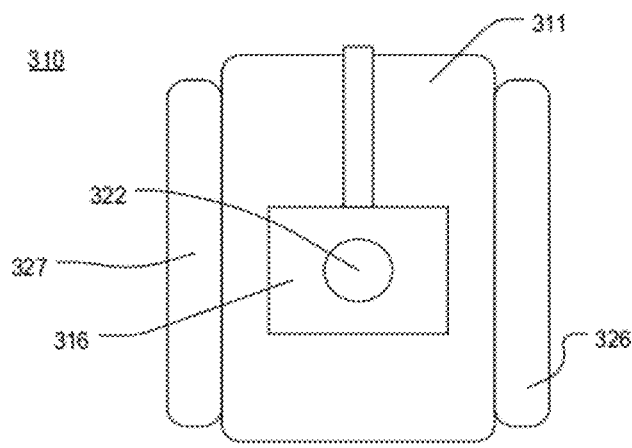
FIG. 12C is a schematic illustration of a top view of the automated vehicle of FIG. 12A.

FIGS. 12A-12C are schematic views of a preferred embodiment of an automated vehicle that uses optical sensors and internal digital circuitry to follow lines of various colors and emit responses specific to the color of line being followed. FIG. 12A is a side schematic view of such an automated vehicle 310. FIG. 12B is a bottom schematic view of the vehicle 310. FIG. 12C is a top schematic view of the vehicle 310. As shown in the drawings, the automated vehicle 310 resembles a tank. In other embodiments the automated vehicle resembles a car, a train, a bus, or any other similar type vehicle. In each such case, the automated vehicle 310 includes a vehicle body 311 and at least one running gear 313 for supporting the vehicle and facilitating movement thereof. In various embodiments, the running gear 313 may take the form of wheels, treads, belts or various other means of facilitating movement.

The vehicle 310 is further configured to recognize a wide range of colors and perform various actions in response to those colors, including emitting sounds. The vehicle 310 operates similar to the vehicle 10 described above, however, whereas vehicle 10 operated by, and was generally limited to, detecting and responding to monochrome or grayscale lines or tracks, the vehicle 310 includes an optical system 330 that is sensitive to a wide range of light wavelengths and a microcontroller permitting more complex and diverse vehicle responses.

As shown in FIGS. 12A-12C, the automated vehicle 310 comprises a vehicle body or chassis 311, a turret 316, a first motor 318, a second motor 319, internal circuitry 320, a display LED 322, a battery 323, and a speaker 324. The chassis 311 includes a right continuous tread assembly 326 propelled by the first motor 318 and a left continuous tread assembly 327 propelled by the second motor 319.

Figure 13A:
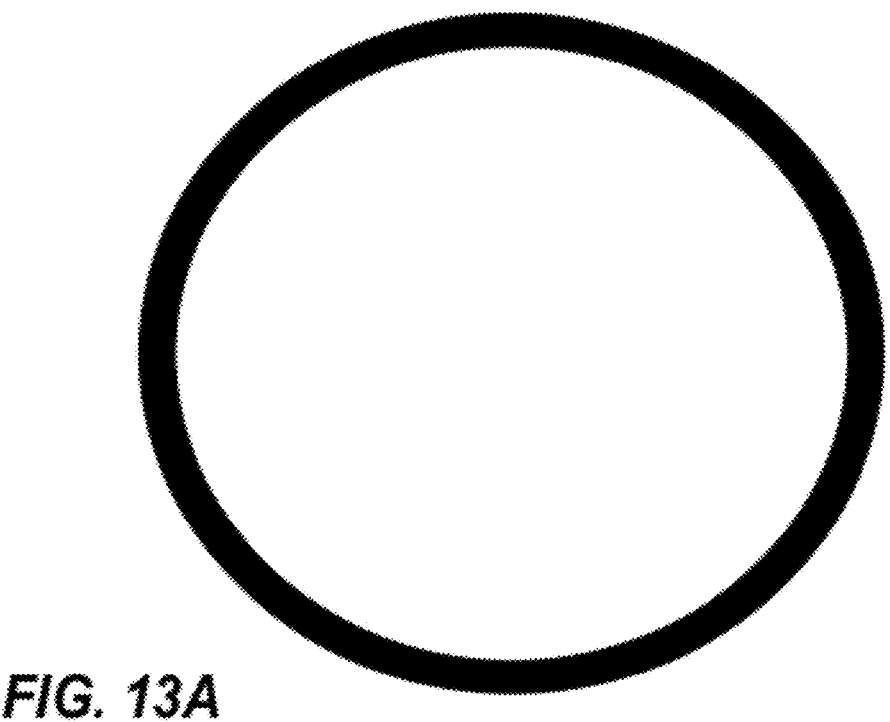
FIG. 13A is an illustration of a monochrome line which the vehicle of FIG. 12A is configured to follow.
Figure 13B:
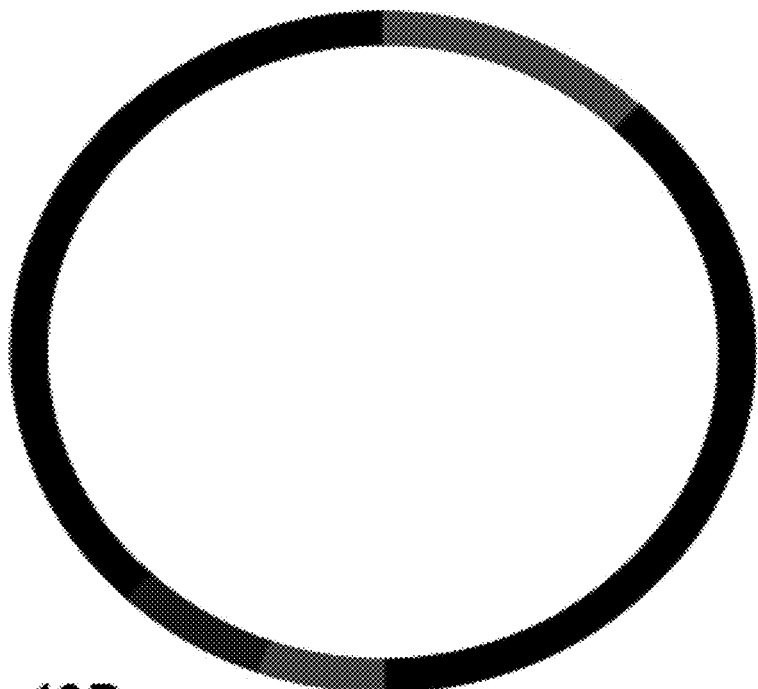
FIG. 13B is an illustration of a multi-colored line which the vehicle of FIG. 12A is configured to follow.

FIGS. 13A and 13B illustrate lines that the automated vehicle 310 is capable of following. In both FIGS. 13A and 13B, the line is configured as a generally circular track. It will be appreciated by the Ordinary Artisan that the lines can be of various shapes and configurations. For instance, the line may form an elliptical track or an irregularly shaped track. Furthermore, the lines can be arranged as two straight parallel tracks, configured in such a way that two automated vehicles 310 may race each other. FIG. 13A represents a black line on a white background. FIG. 13B represents a line comprised of multiple segments of varied colors on a white background. The automated vehicle 310 is configured to follow both the lines of FIGS. 13A and 13B, however, while following the line shown in FIG. 13B, the vehicle 310 is configured to produce additional responses, such as emitting sounds or flashing lights. It is further contemplated that customized tracks may be drawn using colored pencils, pens, crayons, markers, chalk, or other drawing devices. These tracks may be traced from patterns or drawn freehand, thereby permitting a user to create his or her own track.

Figure 14:
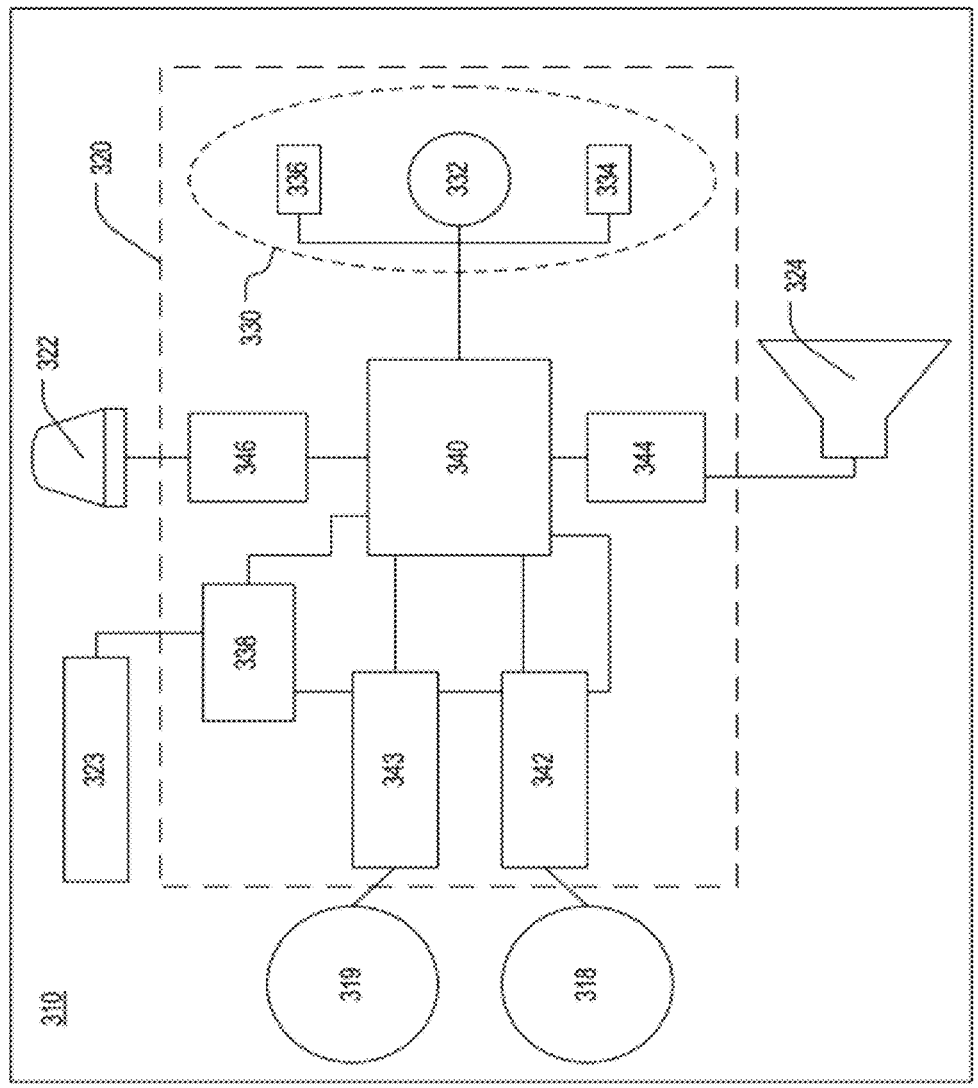
FIG. 14 is a simple schematic diagram of various internal components of the automated vehicle of FIG. 12A.
Figure 15:
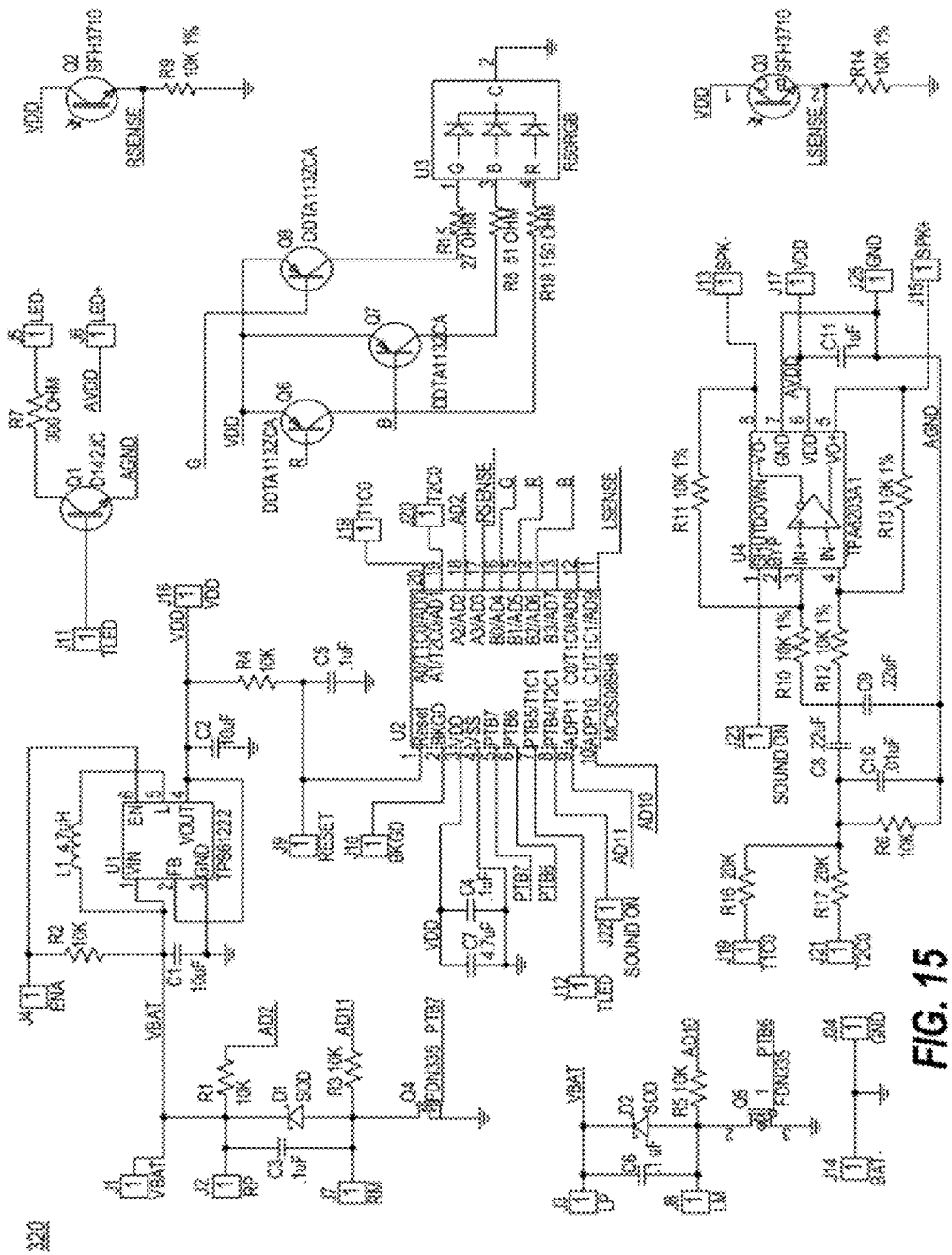
FIG. 15 is a detailed schematic diagram of the internal circuitry of the automated vehicle of FIG. 12A.

FIG. 14 is a simple schematic diagram of various internal components of the automated vehicle 310, including the internal circuitry 320, the first motor 318, the second motor 319, the display LED 322, the battery 323, and the speaker 324. FIG. 15 is a detailed schematic diagram of the internal circuitry 320. As shown schematically in FIG. 14, the internal circuitry 320 comprises an optical system 330, including a light source 332, a right optical sensor 334 and a left optical sensor 336. Both optical sensors 334,336 are sensitive to a wide range of light wavelengths. The internal circuitry 320 further comprises a DC-to-DC converter 338, a microcontroller 340, a first motor control 342, a second motor control 343, speaker control circuitry 344, and display LED control circuitry 346. The light source 332 in at least one contemplated embodiment is a single tri-color RGB-LED and is used to provide light for both the right and left optical sensors 334, 336. However, the Ordinary Artisan would appreciate that a number of differently colored LEDs could be used. In at least one contemplated embodiment, the light source 332 is a 4-Pin Super Flux RGB LED Lamp Orca R Series.

Figure 16A:
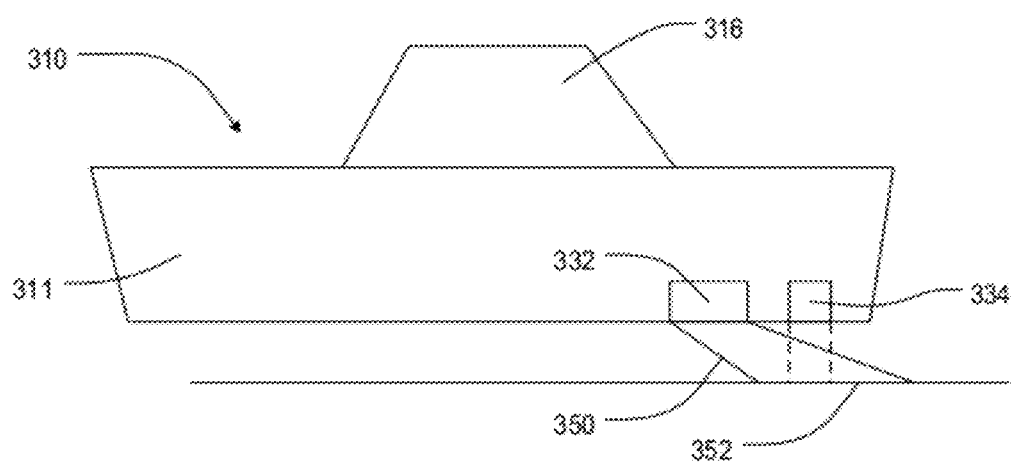
FIG. 16A is a schematic illustration of a side view of the automated vehicle of FIG. 12A, detailing the function and position of the optical system.
Figure 16B:
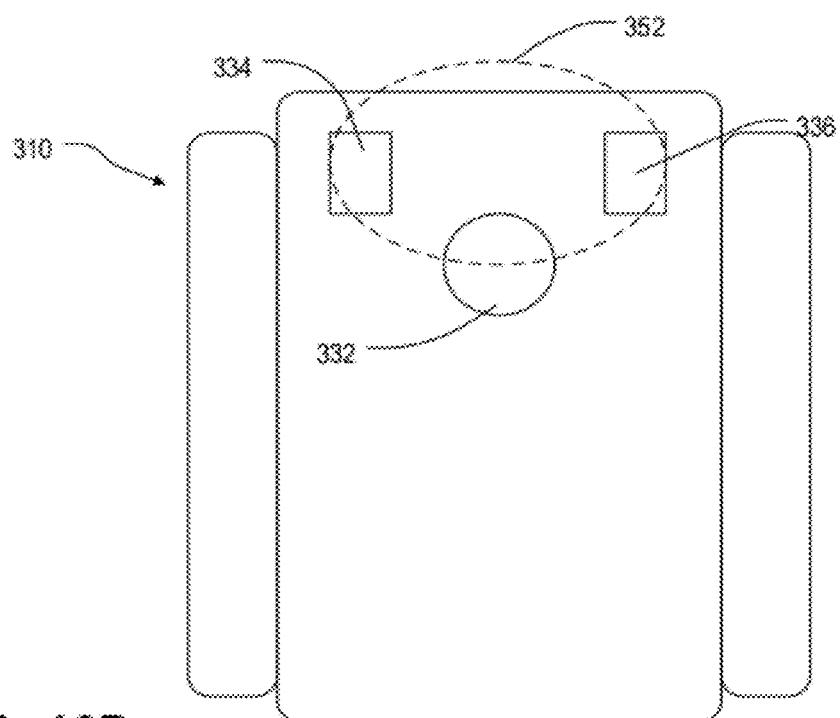
FIG. 16B is a schematic illustration of an underside view of the automated vehicle of FIG. 12A, further detailing the function and position of the optical system.

FIGS. 16A and 16B are side and bottom schematic views of the automated vehicle 310, detailing the position and function of the optical system 330. As shown in FIGS. 16A and 16B, the light source 332 is mounted in a central position toward the front of the vehicle 310 and projects an approximate cone of light 350 that results in a circle of illumination 352 of approximately ¼ of an inch in diameter at the surface upon which the vehicle 310 rests. The optical sensors 334,336 are located to the right and left, respectively, of the light source 332. The optical sensors 334,336 are arranged such that they can detect the projected circle 352 from approximately the centerline of the vehicle 310 to their respective right and left sides. Such detecting may be accomplished by positioning the sensors 334,336 in such a way that light from the left side of the vehicle 310 is blocked from reaching the right sensor 334 and light from the right side of the vehicle 310 is blocked from reaching the left sensor 336. Stated in another way, the right sensor 334 is configured to sense light on the right side, and the left sensor 336 is configured to sense light on the left side.

The sensors 334,336 regulate the voltage input to the microcontroller 340 by conducting a current proportional to the amount of light they detect. This current generates a voltage measured by an analog to digital converter located in the microcontroller 340. It will be appreciated by the Ordinary Artisan that the vehicle 310 is at least generally insensitive to ambient light because the amount of LED light reflected from the surface below the vehicle 310 and detected by the sensors 334,336 is relatively large by comparison with any ambient light.

In one contemplated embodiment of the vehicle 310, the light source 332 contains three individual LEDs corresponding to the three primary colors of light: red, green, and blue. The individual LEDs are sequenced on and off by control logic of the microcontroller 340. When each individual LED is turned on, it projects a cone of light 350 resulting in an approximate circle of illumination 352 on the surface beneath the vehicle 310. A portion of the light projected is absorbed by the surface, which may include a line, track or path, depending on the color of the surface being illuminated. The remainder of the light is reflected back toward the vehicle 310 and is sensed by each of the optical sensors 334,336. Each optical sensor 334,336 then generates an analog signal that it sends to the microcontroller 340. At the microcontroller 340, the analog signal is converted to a digital signal and then stored. In this way, individual left and right readings, referred to as RGB readings, are collected for each of the primary colors emitted by the light source 332. These readings can be characterized as the arrays $RGB_{right}=[R_r,G_r,B_r]$ and $RGB_{left}=[R_l,G_l,B_l]$, where, for instance, $R_r$ refers to the brightness of red light reflected by the surface and detected by the right sensor and $G_l$ refers to the brightness of green light reflected by the surface and detected by the left sensor.

The quantity of light reflected by the surface below the vehicle 310 is determined by the brightness level of the surface, which is a function of the brightness of each of the primary colors of light comprising the surface. In at least one preferred embodiment, the brightness level is calculated by measuring the sum of the RGB color values of the surface. Stated another way, the optical sensors 334,336 sense an amount of light approximately proportional to the color and brightness of the surface, thereby permitting the color and brightness of the surface to be calculated by comparing the relative RGB readings. For instance, a white surface provides high level RGB values that are approximately equal, and a black surface provides a similar RGB ratio, but at a lower level. Similarly, each color reflects an amount of light that depends upon the RGB content of the color. For instance, if the color happens to be exactly the same as one of the LED colors, a sensor output would only be seen for that particular LED. However, from a practical standpoint, this circumstance is uncommon because most printed color contains some mixture of RGB components. In this way, the sensor more commonly responds to this mixture of RGB pigments and produces outputs relative to the pigment ratios. For instance, a standard red contains almost no blue but might contain some green. By comparing the proportion of different mixtures, the color of the surface can be determined.

Generally, the steering of the automated vehicle 310 is controlled through the optical system 330. As described above, the right and left optical sensors 334,336 each output three RGB values, $[R_r,G_r,B_r]$ and $[R_l,G_l,B_l]$, to the microcontroller. The microcontroller 340 then sums the three individual RGB values for both the left and right channels, resulting in two separate values, $[RGB_r, RGB_l]$, where $RGB_r=R_r+G_r+B_r$ and $RGB_l=R_l+G_l+B_l$. The values $RGB_r$ and $RGB_l$ are used to calculate an input command in a normal Proportional-Integral-Derivative control loop ("PID loop") to control the speed of the first motor 318 and second motor 319, respectively. This two-dimensional, or monochrome, solution is possible because steering is generally a two-dimensional problem. Using a monochrome signal has the further advantage of being responsive to a wide range of colors, as well as shades of gray.

In at least one preferred embodiment of the vehicle 310, the right sensor output, $[RGB_r]$, controls the first motor 318, which is situated at the right lateral side of the vehicle 310, and the left sensor output, $[RGB_l]$, controls the second motor 319, which is situated at the left lateral side of the vehicle 310. If $[RGB_r]$ is greater than $[RGB_l]$, or in other words, if the right sensor detects a higher brightness than the left sensor, the first motor 318 runs faster than the second motor 319 which causes the vehicle 310 to turn to the left. For example, if the vehicle 310 is following a dark line printed on a light background and drifts slightly to the right of the line, the right optical sensor 334 detects a higher brightness and, accordingly, causes the first motor 318 to run faster, thereby correcting the steering of the vehicle 310 back toward the line. In this way, the vehicle 310 tends to follow a line. The vehicle 310 is capable of following a line of any color composition. Furthermore, the line may be composed of a variety of media, including markers, crayons, pencils, paints, and chalks, and is not restricted to an infrared absorbing ink. However, the steering capability of the automated vehicle 310 is sensitive to the brightness level of the line.

Further enhancements to the steering may be possible by optimizing the size of the light spot 352 as well as increasing the gain of the PID loop. This could potentially allow the vehicle 310 to follow a finer line. Additionally, this makes the overall speed of the vehicle 310 proportional to the "brightness" of the surface upon which it is resting. In other words, the vehicle 310 is configured to travel fastest on a white surface and slower on a medium color tone or gray surface. The vehicle 310 may be configured to stop on a surface that is largely black or another very dark color. Moreover, the vehicle 310 may be configured to stop if raised a sufficient distance off the resting surface.

The optical system 330 has the further ability to trigger events in the automated vehicle 310 by detecting and responding to different colors. In at least one contemplated embodiment, a variety of different colors are used to trigger the generation of different sound tones that are amplified by the internal speaker 324. Additionally, or alternatively, different colors are used to activate the display LED 322.

Output of the LED light source 332 may not necessarily be projected uniformly. In this way, one sensor may be more sensitive to blue output and the other may be more sensitive to red and green output. To improve color differentiating capability, electronics within the vehicle 310, such as a microcontroller, sum the left and right channel RGB values prior to making a color determination. A more uniform color output would allow independent left and right color determination.

The internal circuitry 320 of the automated vehicle 310 includes a time-based correction algorithm that compensates for temperature drift of the LED output. Over operating time, the temperature of the individual LEDs in the light source 332 may increase, thereby causing the brightness of each LED to slightly change, which would negatively impact the accuracy of the color detection process. More specifically, temperature drift may affect the white balance of the system over operating time. The time-based correction algorithm corrects temperature drift by changing the relative contribution of each LED in the light source 332 over time. Improvement of this algorithm allows the vehicle 310 to detect more colors. One contemplated method to improve the algorithm is the addition of a device for measuring temperature directly.

The ability of the optical system 330 to differentiate color can also be used to trigger steering events, such as causing the vehicle 310 to make an abrupt turn or to perform a loop.

The PID loop that controls the motor speed may be configured to use a "Pulse Width Modulation" scheme that adjusts the average voltage applied to the motors by time varying the duty cycle of the motor power switches that comprise the motor control circuitry 342,343.

Each motor 318,319 may be a DC motor that generates a back EMF that is proportional to its speed. The back EMF is measured by sampling the motor voltage during time periods where the motors 318,319 are not connected to the battery 323. This is accomplished by measuring the motor voltage using the analog to digital converter, or ADC, in the microcontroller 340. Furthermore, because the motor switches can be placed in the ground sides of the motors 318,319 for efficiency reasons, the ADC measurements may be relative to the positive battery terminal. To compensate for this, the battery voltage is also measured in a similar manner. The respective motor reading may then be subtracted from the battery reading to obtain a reading proportional to the motor speed. In other words, when the motor is stopped, the reading may be the same as the battery so that the subtraction results in a difference of zero, corresponding to a speed of zero. As the motor speed increases, this difference becomes larger.

The control logic in the microcontroller 340 then compares the current motor speed to the reflected sensor signal and generates an error that is proportional to the difference. A differential component that is proportional to the change in error over time is also factored in, thereby providing differential compensation to help stabilize the control loop. In this regard, no Integral compensation has been implemented, and the PID loop may be characterized as a PD loop.

In at least one embodiment, the vehicle 310 is powered by two small NiMh batteries 323. These batteries 323 on their own do not necessarily provide a high enough voltage (greater than 4 Volts) to accommodate the green or blue LEDs. To accommodate this, a DC to DC converter 338 may be included to boost the battery voltage to a constant 5 Volts.

In at least one embodiment, the vehicle 310 further includes a display LED 322 mounted on the turret 316. The display LED 322 is associated with the control logic within the microcontroller 340 and is PWM modulated in response to the speed of the first motor 318. This makes the brightness of the display LED 322 change with the speed of the automated vehicle 310. The display LED 322 may also be used for other purposes.

Various other features may be implemented in the vehicle 310. In at least one embodiment, different program modes are available, including tone-only mode, song mode, where popular jingles are played, and modes selecting from different vehicle stunts. These various modes are selected by a switch or some other sensing ability. For example, if the vehicle 310 is switched on while on a red surface, one set of options may be enabled. If the vehicle 310 is switched on or initially placed on a green surface, an alternate set of options may be enabled. Furthermore, sound effects responses could be associated with various colors. For instance, operation on a red surface could produce an explosion sound. Operation on a blue surface could produce a slashing sound, resembling the sound of a tank moving through water.

Figure 17A:
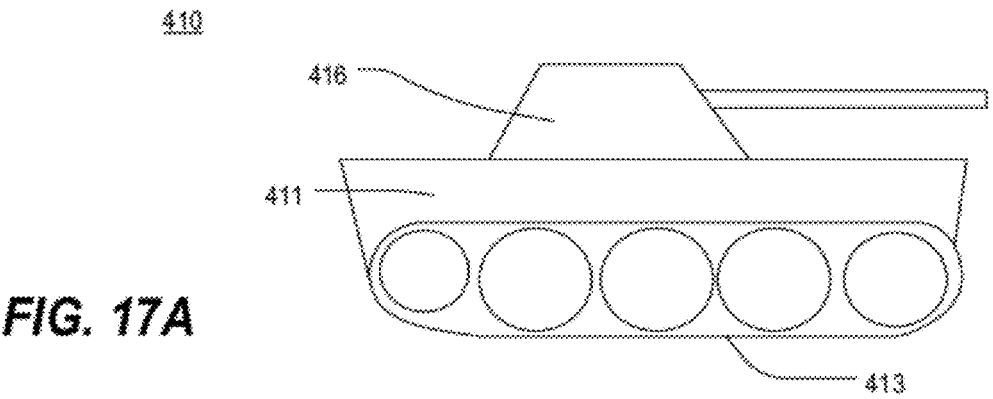
FIG. 17A is a schematic illustration of a side view of an alternate embodiment of an automated vehicle that uses a single optical sensor and internal digital circuitry to follow lines of various colors and emit responses specific to the color of line being followed.
Figure 17B:
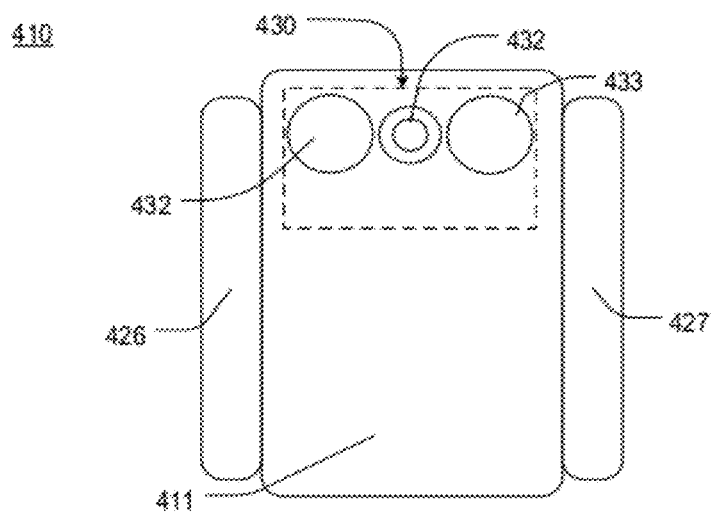
FIG. 17B is a schematic illustration of a bottom view of the automated vehicle of FIG. 17A.
Figure 17C:
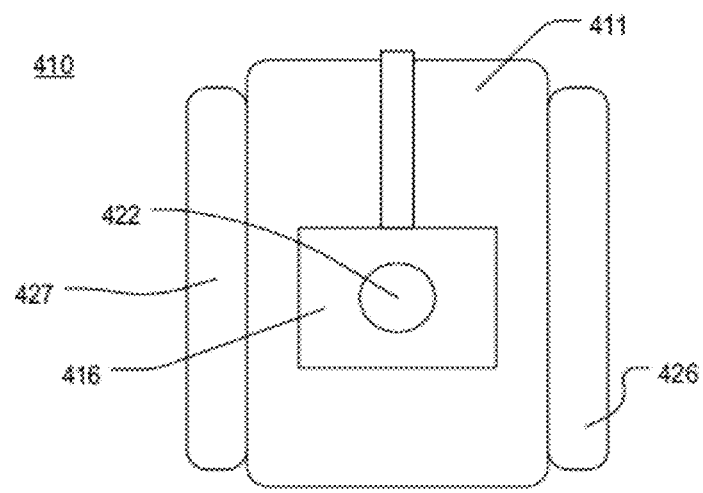
FIG. 17C is a schematic illustration of a top view of the automated vehicle of FIG. 17A.

FIGS. 17A-17C are schematic views of a preferred embodiment of an automated vehicle that uses a single optical sensor and internal digital circuitry to follow lines of various colors and perform an action specific to the color of line being followed. FIG. 17A is a side schematic view of such an automated vehicle 410. FIG. 17B is a bottom schematic view of the vehicle 410. FIG. 17C is a top schematic view of the vehicle 410. As shown in the drawings, the automated vehicle 410 resembles a tank. In other embodiments the automated vehicle resembles a car, a train, a bus, or any other similar type vehicle. In each such case, the automated vehicle 410 includes a vehicle body 411 and at least one running gear 413 for supporting the vehicle and facilitating movement thereof. In various embodiments, the running gear 413 may take the form of wheels, treads, belts or various other means of facilitating movement.

The vehicle 410 is further configured to recognize a wide range of colors and perform various actions in response to those colors, including emitting sounds. The vehicle 410 operates similar to the vehicles 10 and 310 described above, however, whereas vehicle 10 and vehicle 310 include an optical system comprising two optical sensors, one corresponding to the left side of the vehicle and one corresponding to the right side of the vehicle, the vehicle 410 includes an optical system comprising one centrally-located optical sensor.

As shown in FIGS. 17A-17C and FIG. 18, the automated vehicle 410 comprises a vehicle body or chassis 411, a turret 416, a first motor 418, a second motor 419, internal circuitry 420, a display LED 422, one or more batteries 423, and a speaker 424. The chassis 411 includes a right continuous tread assembly 426 propelled by the first motor 418 and a left continuous tread assembly 427 propelled by the second motor 419.

Similar to the vehicle 310, the vehicle 410 is capable of following lines as shown in FIGS. 13A and 13B, as well as other lines of various shapes and configurations. Furthermore, like the vehicle 310, the vehicle 410 is configured to perform additional responses, such as emitting sounds or flashing lights, in response to sensing colored lines.

Figure 18:
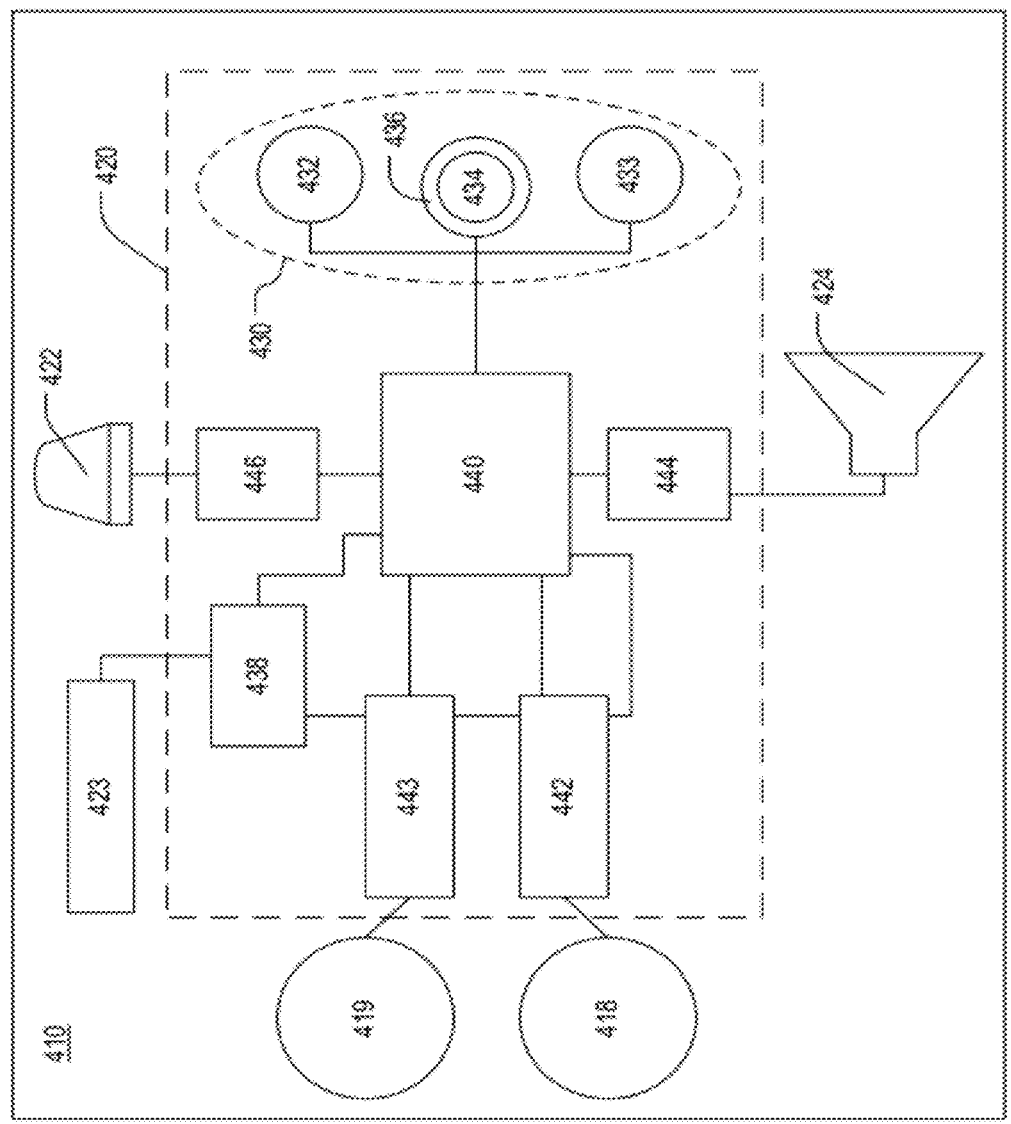
FIG. 18 is a simple schematic diagram of various internal components of the automated vehicle of FIG. 17A.
Figure 19:
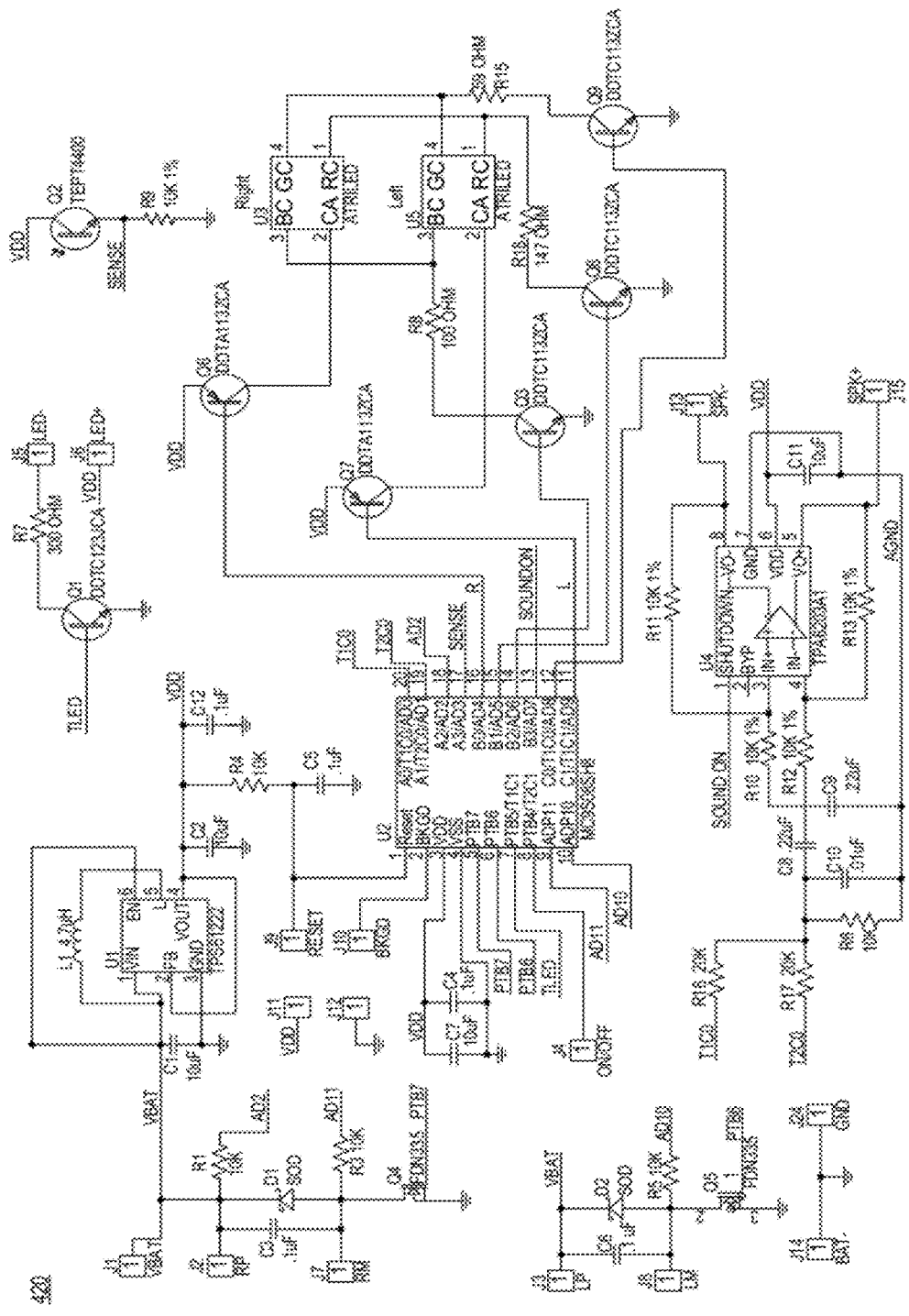
FIG. 19 is a detailed schematic diagram of the internal circuitry of the automated vehicle of FIG. 17A.

FIG. 18 is a simple schematic diagram of various internal components of the automated vehicle 410, including the internal circuitry 420, the first motor 418, the second motor 419, the display LED 422, the one or more batteries 423, and the speaker 424. FIG. 19 is a detailed schematic diagram of the internal circuitry 420. As shown schematically in FIG. 18, the internal circuitry 420 comprises an optical system 430, including a right-side light source 432, a left-side light source 433, a single optical sensor 434 and a shield tube 436. The optical system 430 is described in further detail hereinbelow. The internal circuitry 420 further comprises a DC-to-DC converter 438, a microcontroller 440, a first motor control 442, a second motor control 443, speaker control circuitry 444, and display LED control circuitry 446.

Figure 20A:
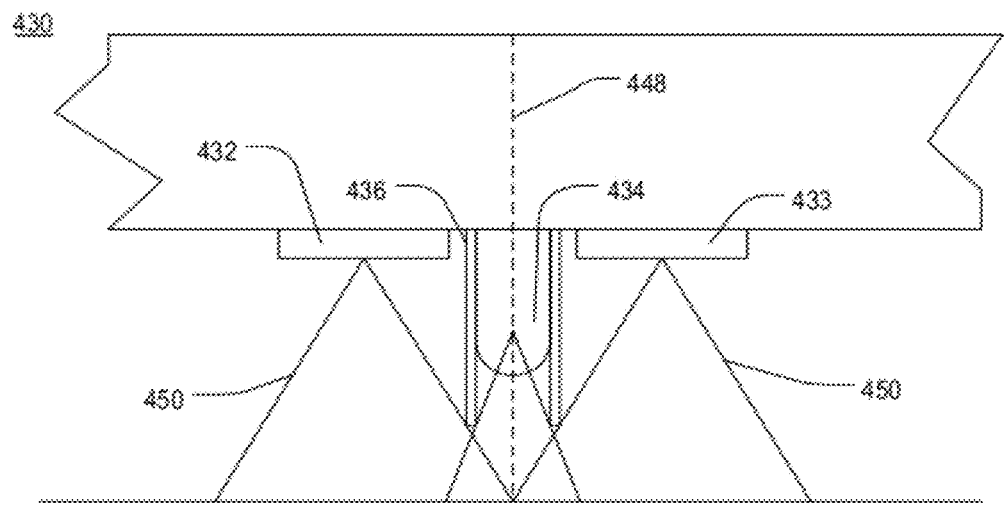
FIG. 20A is a schematic diagram of a front view of the optical system of the automated vehicle of FIG. 17A.

FIG. 20A is a schematic diagram of a front view of the optical system 430. The optical system 430 comprises a right-side light source 432, a left-side light source 433, and a single optical sensor 434 surrounded by a shield tube 436 and positioned centrally between the two light sources 432,433. Each of the light sources 432,433 projects an approximate circle of illumination 450 on the surface below. The optical sensor 434 includes an optical lens that provides a finite viewing area 452 and a somewhat smaller optimal viewing area 454. The optical sensor 434 is surrounded by the shield tube 436, which blocks source lighting from the right-side light source 432 and the left-side light source 433 at a particular angle. The geometry of the angle is selected such that the light sources 432,433 only provide detectable illumination from one side of an optical center line 438. Thus, the optical sensor 434 only detects light from the left-side light source 433 shining to the left of the optical center line 438 and light from the right-side light source 432 shining to the right of the optical center line 448. It will be appreciated that although a shield tube is shown, any optical barrier capable of blocking the source lighting at the required angle may be utilized.

Figure 20B:
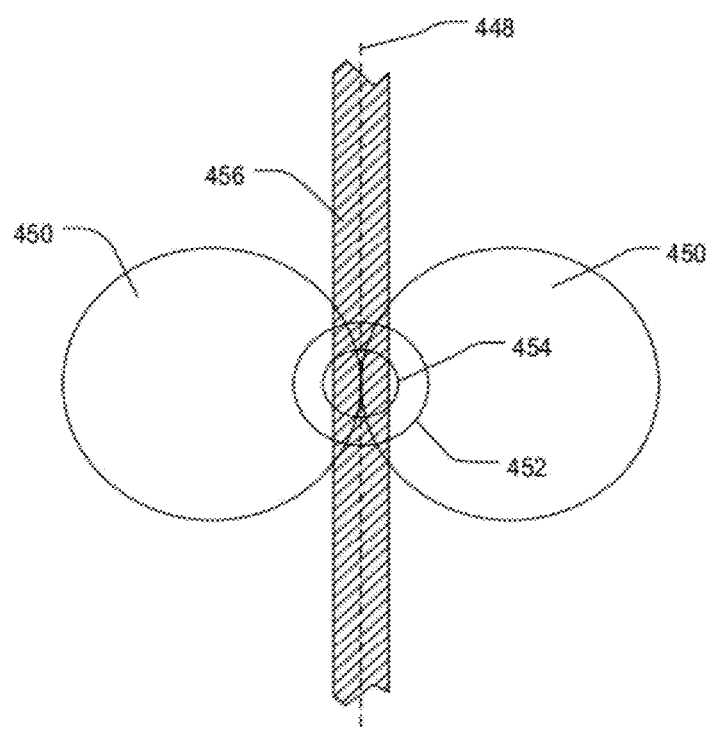
FIG. 20B is a schematic diagram of the surface beneath the optical system of FIG. 20A.

FIG. 20B is a schematic diagram of the surface beneath the optical system 430 of FIG. 20A. FIG. 20B illustrates the approximate circles of illumination 450 projected by the light sources 432,433, the viewing area 452, the optimal viewing area 454, and a surface having a line 456 detectable by the optical system 430. In at least one preferred embodiment, the line 456 has an approximate width of 0.07-inches.

The optical sensor 434 is sensitive to a wide range of light wavelengths. The light sources 432,433 in at least one contemplated embodiment are tri-color RGB-LEDs. However, the Ordinary Artisan would appreciate that a number of differently colored LEDs could be used. In at least one contemplated embodiment, the light sources 432,433 are 4-Pin Super Flux RGB LED Lamp Orca R Series, which is manufactured by Bivar.

The sensor 434 regulates the voltage input to the microcontroller 440 by conducting a current proportional to the amount of light it detects. This current generates a voltage measured by an analog to digital converter located in the microcontroller 440. It will be appreciated by the Ordinary Artisan that the vehicle 410 is at least generally insensitive to ambient light because the amount of LED light reflected from the surface below the vehicle 410 and detected by the sensor 434 is relatively large by comparison with any ambient light.

In one contemplated embodiment of the vehicle 410, each of the light sources 432,433 contains three individual LEDs corresponding to the three primary colors of light: red, green, and blue. The individual LEDs are sequenced on and off by control logic of the microcontroller 440 in an alternating left-right sequence. Due to the geometry of the optical system 430 and the presence of the shield tube 436, this alternating illumination allows the sensor 434 to detect only light to the left of the optical center line 448 when the left-side light source 433 is activated and only light to the right of the optical center line 448 when the right-side light source 432 is activated. Furthermore, as the LEDs are sequenced left and right, the colors of the LEDs alternate from red to green to blue. For example, the sequence may read left/Red, right/Red, left/Green, right/Green, left/Blue, right/Blue, ($R_l, R_r, G_l, G_r, B_l, B_r$), etc. In this manner, the optical system 430 facilitates measurement of the color of the surface below the optical sensor 434.

As illustrated in FIGS. 20A and 20B, when illuminated, each individual LED projects a cone of light resulting in an approximate circle of illumination 450 on the surface beneath the vehicle 410, part of said circle of illumination 450 being within the viewing area 452 of the optical sensor 434. A portion of the light projected is absorbed by the surface, which may include a line, track or path, depending on the color of the surface being illuminated. The remainder of the light is reflected back toward the vehicle 410 and is sensed by the optical sensor 434. The optical sensor 434 then generates an analog signal that is transmitted to the microcontroller 440. At the microcontroller 440, the analog signal is converted to a digital signal and stored. In this way, individual left and right readings, referred to as RGB readings, are collected for each of the primary colors emitted by the light sources 432,433.

The quantity of light reflected by the surface below the vehicle 410 is determined by the brightness level of the surface, which is a function of the brightness of each of the primary colors of light comprising the surface. In at least one preferred embodiment, the brightness level is calculated by measuring the sum of the RGB color values of the surface. Stated another way, the optical sensor 434 senses an amount of light approximately proportional to the color and brightness of the surface, thereby permitting the color and brightness of the surface to be calculated by comparing the relative RGB readings. These readings can be characterized as the arrays $RGB_{right}=[R_r,G_r,B_r]$ and $RGB_{left}=[R_l,G_l,B_l]$, where, for instance, $RGB_{right}$ refers to a function of the total brightness of light reflected by the surface and detected by the sensor 434 at the right of the optical center line 448, $R_r$ refers to the brightness of red light reflected by the surface and detected by the sensor 434 at the right of the optical center line 448, and $G_l$ refers to the brightness of green light reflected by the surface and detected by the sensor 434 at the left of the optical center line 448.

It will be appreciated that, in using such a scheme, a white surface provides high level RGB values that are approximately equal to one another (e.g., RGB=[255,255,255]=765), and a black surface provides a similar RGB ratio, but at a lower absolute level (e.g., RBG=[0,0,0]=0). Similarly, each color reflects an amount of light that depends upon the RGB content of the color. For instance, if the color happens to be the same as one of the LED colors, a sensor output would only be seen for that particular LED. However, from a practical standpoint, this circumstance is uncommon because most printed color contains some mixture of RGB components. In this way, the sensor 434 more commonly responds to this mixture of RGB pigments and produces outputs relative to the pigment ratios. For instance, a standard red contains almost no blue but might contain some green. By comparing the proportion of different mixtures, the color of the surface can be determined.

Generally, the steering of the automated vehicle 410 is controlled through the optical system 430. As described above, the optical sensor 434 outputs RGB values, $R_l, R_r, G_l, G_r, B_l,$ and $B_r$, to the microcontroller 440. In a preferred embodiment, the RGB value that corresponds with the color that generates the least amount of signal, as calculated by the microcontroller 440, will control the steering of the automated vehicle 410. This method allows for more sensitive feedback, and hence, more accurate steering, than summing all the color values. More specifically, this method of steering provides improved tracking of arbitrary-colored lines. For example, a blue line provides the least amount of signal when illuminated by the Red LED, therefore, $R_r$ and $R_l$ will be used to generate a two-dimensional, or monochrome, signal to control the steering. The values $R_r$ and $R_l$ are used to calculate an input command in a normal Proportional-Integral-Derivative control loop ("PID loop") to control the speed of the first motor 418 and second motor 419, respectively. This two-dimensional, or monochrome, solution is possible because steering is generally a two-dimensional problem. Using a monochrome signal has the further advantage of being responsive to a wide range of colors, as well as shades of gray.

In at least one preferred embodiment of the vehicle 410, a right RGB value controls the first motor 418, which is situated at the right lateral side of the vehicle 410, and a left RGB value controls the second motor 419, which is situated at the left lateral side of the vehicle 410. If the right RGB value is greater than the left RGB value, or in other words, if the sensor 434 detects a higher brightness to the right of the optical center line 448 than to the left of the optical center line 448, the first motor 418 runs faster than the second motor 419 which causes the vehicle 410 to turn to the left. For example, if the vehicle 410 is following a dark line printed on a light background and drifts slightly to the right of the line, the optical sensor 434 detects a higher brightness to the right of the optical center line 448 and, accordingly, causes the first motor 418 to run faster, thereby correcting the steering of the vehicle 410 back toward the line. In this way, the vehicle 410 tends to follow a line. The vehicle 410 is capable of following a line of any color composition. Furthermore, the line may be composed of a variety of media, including markers, crayons, pencils, paints, and chalks, and is not restricted to an infrared absorbing ink. However, the steering capability of the automated vehicle 410 is sensitive to the brightness level of the line.

It will further be appreciated that the microcontroller 440 can analyze the individual right and left RGB values to approximate the color of the line or surface beneath the automated vehicle 410. It will be appreciated that the color determination is the average color of the view that the optical sensor 434 has to the left and the right of the optical center line 448. Furthermore, the microcontroller 440 has the ability to trigger events in the automated vehicle 410 in response to the optical sensor 434 detecting lines and/or surfaces of different colors. In at least one contemplated embodiment, a variety of different colors are used to trigger the generation of different sound tones that are amplified by the internal speaker 424. Additionally, or alternatively, different colors are used to activate the display LED 422. The ability of the optical system 430 to differentiate color can also be used to trigger steering events, such as causing the vehicle 410 to make an abrupt turn or to perform a loop.

In at least on preferred embodiment, the internal circuitry 420 of the automated vehicle 410 includes a time-based correction algorithm that compensates for temperature drift of the LED output. Over operating time, the temperature of the individual LEDs in the light sources 432,433 may increase, thereby causing the brightness of each LED to slightly change, which would negatively impact the accuracy of the color detection process. More specifically, temperature drift may affect the white balance of the system over operating time. The time-based correction algorithm corrects temperature drift by changing the relative contribution of each LED in the light source 432,433 over time. Improvement of this algorithm allows the vehicle 410 to detect more colors. One contemplated method to improve the algorithm is the addition of a device for measuring temperature directly.

The PID loop that controls the motor speed may be configured to use a "Pulse Width Modulation" scheme that adjusts the average voltage applied to the motors by time varying the duty cycle of the motor power switches that comprise the motor control circuitry 442,443. Each motor 418,419 may be a DC motor that generates a back EMF that is proportional to its speed. The back EMF is measured by sampling the motor voltage during time periods where the motors 418,419 are not connected to the one or more batteries 423. This is accomplished by measuring the motor voltage using the analog to digital converter, or ADC, in the microcontroller 440. Furthermore, because the motor switches can be placed in the ground sides of the motors 418,419 for efficiency reasons, the ADC measurements may be relative to the positive battery terminal. To compensate for this, the battery voltage is also measured in a similar manner. The respective motor reading may then be subtracted from the battery reading to obtain a reading proportional to the motor speed. In other words, when the motor is stopped, the reading may be the same as the battery so that the subtraction results in a difference of zero, corresponding to a speed of zero. As the motor speed increases, this difference becomes larger. The control logic in the microcontroller 440 then compares the current motor speed to the reflected sensor signal and generates an error that is proportional to the difference. A differential component that is proportional to the change in error over time is also factored in, thereby providing differential compensation to help stabilize the control loop. In this regard, no Integral compensation has been implemented, and the PID loop may be characterized as a PD loop.

In at least one embodiment, the vehicle 410 is powered by two small NiMh batteries 423. These batteries 423 on their own do not necessarily provide a high enough voltage (greater than 4 Volts) to accommodate the green or blue LEDs. To accommodate this, a DC to DC converter 438 may be included to boost the battery voltage to a constant 5 Volts.

In at least one embodiment, the vehicle 410 further includes a display LED 422 mounted on the turret 416. The display LED 422 is associated with the control logic within the microcontroller 440 and is PWM modulated in response to the speed of the first motor 418. This makes the brightness of the display LED 422 change with the speed of the automated vehicle 410. The display LED 422 may also be used for other purposes.

Various other features may be implemented in the vehicle 410. In at least one embodiment, different program modes are available, including tone-only mode, song mode, where popular jingles are played, and modes selecting from different vehicle stunts. These various modes are selected by a switch or some other sensing ability. For example, if the vehicle 410 is switched on while on a red surface, one set of options may be enabled. If the vehicle 410 is switched on or initially placed on a green surface, an alternate set of options may be enabled. Furthermore, sound effects responses could be associated with various colors. For instance, operation on a red surface could produce an explosion sound. Operation on a blue surface could produce a slashing sound, resembling the sound of a tank moving through water.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:
1. An automated vehicle comprising:
 (a) a vehicle body;
 (b) a power source;
 (c) one or more motors housed within the vehicle body and in operable connection with the power source;
 (d) running gear in operable connection with the one or more motors for facilitating movement and supporting the vehicle body upon a surface; and
 (e) an optical system comprising:
  (i) an optical sensor for detecting light reflected from the surface and generating an output in response to the light reflected; and
  (ii) at least two light sources associated with the optical sensor, each light source capable of projecting light on the surface;
 (f) wherein the optical system is configured to regulate an amount of power supplied to the one or more motors in response to the output generated by the optical sensor;
 (g) wherein the optical sensor has a finite viewing area divided into a right-side viewing area and a left-side viewing area by an optical centerline, and wherein one of the at least two light sources includes a right-side light source configured to project light in the right-side viewing area and another of the at least two light sources includes a left-side light source configured to project light in the left-side viewing area; and
 (h) wherein an optical barrier prevents the right-side light source from projecting light in the left-side viewing area and prevents the left-side light source from projecting light in the right-side viewing area.

2. The automated vehicle of claim 1, wherein the power source comprises one or more batteries housed within the vehicle body.

3. The automated vehicle of claim 1, wherein the optical system includes a microcontroller in operable connection with the power source and the one or more motors, the microcontroller being capable of performing logic operations based on the output.

4. The automated vehicle of claim 1, wherein the one or more motors includes a first motor and a second motor, and wherein the running gear includes a first running gear in operable connection with the first motor and a second running gear in operable connection with the second motor.

5. The automated vehicle of claim 1, wherein the optical barrier is a shield tube at least partially enclosing the optical sensor.

6. The automated vehicle of claim 1, wherein the output relates to one or more RGB-component values of light reflected from either of the right-side viewing area or the left-side viewing area.

7. The automated vehicle of claim 6, wherein at least one of the one or more RBG-component values of light reflected from the right-side viewing area is used to determine the amount of power supplied to a first motor of the one or more motors, and wherein at least one of the one or more RGB-component values of light reflected from the left-side viewing area is used to determine the amount of power supplied to a second motor of the one or more motors.

8. The automated vehicle of claim 1, wherein the output corresponds to the intensity level of the light reflected.

9. The automated vehicle of claim 1, wherein the output is a function of a brightness level of the light reflected from the surface.

10. The automated vehicle of claim 1, wherein the output is related to one or more RGB-component values of light reflected from the surface, and wherein the amount of power supplied to the one or more motors is a function of at least one of the one or more RGB-component values.

11. The automated vehicle of claim 1, wherein the surface includes a grayscale path.

12. The automated vehicle of claim 1, wherein the surface includes a path comprising one or more colors.

13. The automated vehicle of claim 1, wherein the surface includes a gradient path.

14. The automated vehicle of claim 1, wherein the automated vehicle further comprises a speaker configured to produce one or more sounds in response to the light reflected from the surface.

15. The automated vehicle of claim 1, wherein the automated vehicle further comprises a display LED configured to be activated in response to the light reflected from the surface.

16. An automated vehicle comprising:
(a) a vehicle body;
(b) a power source comprising one or more batteries housed within the vehicle body;
(c) a first motor and a second motors housed within the vehicle body and in operable connection with the power source;
(d) a first running gear in operable connection with the first motor and a second running gear in operable connection with the second motor, the first and second running gears facilitating movement and supporting the vehicle body upon a surface;
(e) a microcontroller in operable connection with the power source, the first motor and the second motor, the microcontroller being capable of performing logic operations; and
(f) an optical system in operable connection with the microcontroller, comprising:
  (i) an optical sensor for detecting light reflected from the surface and generating an output in response to the light reflected, the optical sensor having a finite viewing area divided by an optical centerline into a right-side viewing area and a left-side viewing area;
  (ii) a right-side light source configured to project light in the right-side viewing area;
  (iii) a left-side light source configured to project light in the left-side viewing area; and
  (iv) an optical barrier preventing the right-side light source from projecting light in the left-side viewing area and the left-side light source from projecting light in the right-side viewing area;
(g) wherein the microcontroller is capable of performing logic operations based on the output;
(h) wherein the microcontroller is configured to regulate an amount of power supplied to the first motor and the second motor in response to the output generated by the optical sensor.

17. The automated vehicle of claim 16, wherein the surface includes a grayscale path.

18. The automated vehicle of claim 16, wherein the surface includes a path comprising one or more colors.

19. The automated vehicle of claim 16, wherein the surface includes a gradient path.

20. The automated vehicle of claim 16, further comprising a speaker configured to produce one or more sounds in response to the light reflected from the surface.

* * * * *